ELECTRONIC CIRCUITS FOR COMPLEMENTING BINARY-CODED DECIMAL NUMBERS

Filed Dec. 30, 1953 4 Sheets-Sheet 1

INVENTOR.
ROBERT ROYCE JOHNSON,
BY
Seymour M. Rosenberg
HIS ATTORNEY.

July 16, 1957 R. R. JOHNSON 2,799,450

ELECTRONIC CIRCUITS FOR COMPLEMENTING BINARY-CODED DECIMAL NUMBERS

Filed Dec. 30, 1953 4 Sheets-Sheet 2

INVENTOR.
ROBERT ROYCE JOHNSON,
BY
Seymour M. Rosenberg
HIS ATTORNEY.

INVENTOR.
ROBERT ROYCE JOHNSON,
BY
Seymour M. Rosenberg
HIS ATTORNEY.

INVENTOR:
ROBERT ROYCE JOHNSON
BY Henry Heyman
HIS ATTORNEY.

United States Patent Office 2,799,450
Patented July 16, 1957

2,799,450

ELECTRONIC CIRCUITS FOR COMPLEMENTING BINARY-CODED DECIMAL NUMBERS

Robert Royce Johnson, Pasadena, Calif., assignor, by mesne assignments, to Hughes Aircraft Corporation, a corporation of Delaware Application December 30, 1953, Serial No. 401,126
18 Claims. (Cl. 235—61)

This invention relates to electronic circuits for complementing binary-coded decimal numbers, and more particularly to serial complementer circuits which are selectively controllable either to shift, or to shift and complement, an applied number represented by a corresponding series of electrical signals.

Complementer circuits, such as are contemplated by the present invention, are utilized in the computer art where it is advantageous to perform both addition and subtraction operations with a single mechanism. For example, an adding mechanism may be adapted for both addition and subtraction with the introduction of a complementer, subtraction then being accomplished by adding the complement of the subtrahend. Thus, instead of subtracting a number N, the complementary number $(0-N)$ is formed and is then supplied to the adder mechanism. The complement of a number may also be desired where the resultant of an operation has been generated as a complementary number which must be recomplemented to derive the true value thereof.

In decimal digital computers of the prior art it has been an accepted practice to form the 10's complement of a number by first deriving the 9's complement of the number and then adding 1 in the least significant digital place. For example, in complementing the decimal number 4380, the 9's complement is the number 99 . . . 995619, and the addition of 1 then yields the 10's complement, 99 . . . 995620, where the number of 9's is limited only by the capacity of the computer. It is apparent that this method of complementing requires an adder circuit, as well as a 9's complementer circuit. A decimal complementer providing this type of operation is described in U. S. Patent Serial No. 2,639,378, entitled "Electronic Pulse Generator," by Nathan A. Moerman, issued June 30, 1950.

A 9's complementer for use in the binary-coded decimal system wherein four binary digits represent each decimal digit is shown at pages 151 and 188 of "Synthesis of Electronic Computing and Control Circuits," a report of the Computation Laboratory of Harvard University, published in 1951 by the Harvard University Press, Cambridge, Massachusetts. This complementer is designed to provide complements of all numbers applied thereto, hence the information is switched into or around the complementer accordingly as a number is or is not to be complemented. When a complementer of this type is utilized in serial computers it is necessary to provide a special by-pass circuit in order to equalize the time delays for complementing and non-complementing operations.

Where the previously mentioned function of recomplementing a resultant is to be performed by a 9's complementer, it is necessary to route the information through an adder to complete the complementing operation. While it is possible to include in the circuit an additional adder for this express purpose, the general practice has been to reroute the information through the main comparator adder a second time, thus tying up this adder for a longer period of time for each operation.

The 9's complementer disclosed in the Harvard reference is mechanized to operate in a code wherein each decimal digit, hereafter referred to as dit, is represented by four binary digits, or bits, having weights of 8, 4, 2 and 1, respectively, and wherein the decimal digital value is represented by the corresponding binary number. In this code, hereafter referred to as the excess-zero code, the dit value 9, for example, is represented as 1001. Another commonly used code is the excess-three code in which the decimal digital value is represented by the corresponding binary number plus three; for example, the dit value 9 is represented as 1100. As stated in the Harvard reference, the excess-three code is preferred over the excess-zero code for the reason that it is much simpler to form the 9's complement. Accordingly, in the binary-coded-decimal computer art it has been the accepted practice to perform addition and other arithmetic operations in the excess-three code. Another example of such usage is described on page 1326 of an article entitled "The logistics computer," by R. S. Erickson, in Proceedings of the I. R. E., October 1953.

While the excess-three code offers advantages in the ease of complementing, it presents difficulties in other respects. One important difficulty arises with respect to the corrections which are required upon the resultant of an operation in order to maintain its conformity to the established code. Such corrections are inherent in the utilization of a binary code for representing decimal digits, since a dit having ten possible values must be represented by at least four bits having at least sixteen possible combinations, and a one-to-one correspondence between the two numerical codes is lacking.

The fact that these corrections are much more difficult in the excess-three than in the excess-zero code is recognized in copending U. S. patent application, Serial No. 322,665 for "Arithmetic Units for Binary-Coded-Decimal Computers," by E. C. Nelson, filed November 26, 1952, and assigned to the same assignee as this application; wherein both excess-zero and excess-three adder-subtracters are considered. Nelson avoided the complementing operation in the excess-zero-code, which had been characterized in the Harvard reference as impractical, by providing an excess-zero adder-subtracter wherein separate corrections for addition and subtraction are performed. According to the Nelson application the excess-zero addition and subtraction corrections can be mechanized more simply than the excess-three adding correction alone. Thus, while the prior art has generally avoided the excess-zero code because of the supposed impracticability of complementing, it has been shown by Nelson that the excess-zero code is advantageous even without a complementer.

In accordance with the present invention there are provided complementer circuits which are selectively controllable either to shift an applied decimal number, or to derive the complement thereof. The time delays associated with shifting and with complementing are made equal, hence this type of complementer circuit may be made a part of an information channel in a serial computer, with the advantage that the output information series follows the input information series by a fixed time interval. A special by-pass circuit is therefore unnecessary.

A second advantage is provided, in accordance with the present invention, by circuits for deriving the complement of an applied decimal number in one integrated operation, without the need for separate correction circuits or separate adder circuits. Thus, complementer circuits provided by the present invention are selectively controllable either to shift an applied decimal number, or to shift and complement the number in one integrated operation. This type of circuit when used for recomplementing resultants of noncumulative addition or subtraction operations makes it unnecesasry to feed the information back through the adder a second time, thus permitting the operating speed to be approximately twice that of prior art systems.

The present invention also specifically discloses very simple mechanizations of complementer circuits in the excess-zero code, which may be advantageously utilized in conjunction with an adder circuit of the general type described in the above-mentioned copending application Serial No. 322,665 by Nelson. It will be apparent to those skilled in the art that the resulting combination provides a complete arithmetic unit with a minimum of circuitry.

In its basic form the complementer circuit of the present invention is selectively operable in response to a shift-or-complement control signal to produce output signals representing the complement of an applied decimal number, and includes a register means for receiving, and for shifting at a constant rate, a series of groups of binary signals respectively representing the digits of the number in the order of increasing significance. The register means is also actuable to convert each group of signals to represent the 9's complement of the corresponding digit. The complementer circuit includes sequence control means, responsive to the control signal, for generating a sequencing signal prior to and during the reception of the first non-zero digit of the number; and 10's-complementing means, coupled to the register means, is responsive to the control signal and to the sequencing signal for producing signals representing the 10's complement of the first non-zero digit of the number. Also coupled to the register means is 9's-complementing means, responsive to the control signal for actuating the register means to produce signals representing the 9's complements of succeeding digits of the number.

In one embodiment of the invention, output signals representing the 10's complement of the applied number are produced in one integrated operation. In this embodiment the register means includes at least two series-coupled flip-flops and the sequence control means includes a single flip-flop controlled through an associated gating circuit for producing the sequencing signal. The 10's-complementing means includes a first group of gating circuits and the 9's-complementing means a second group of gating circuits, the first group being responsive to the control signal and a first level of the sequencing signal for producing 10's-complemented digits, and the second group being responsive to the control signal and a second level of the sequencing signal for producing 9's-complemented digits. The first and second groups of gating circuits may, for reasons of convenience or economy, be logically combined into a single gating matrix.

In a second embodiment of the invention, the 10's complementing means includes an adder circuit for receiving and adding 1 to the 9's complement signals in order to produce 10's complement signals, and the adder circuit includes a carry circuit, responsive to the control signal for pre-setting the decimal carry to 1. The adder circuit and the carry circuit regenerate the carry signal as many times as there are zero-valued digits preceding the first non-zero digit of the number, hence these circuits function as the sequence control means.

It thus appears that the present invention provides serial electronic binary-coded decimal complementer circuits which are capable of performing all necessary translations in one integrated operation. Despite the suggestions in the prior art of the undesirability of the excess-zero code, the present invention makes it possible to realize hitherto unknown advantages of that code. The circuits of the present invention are reliable in operation, cheap and easy to construct, and are very simple considering the complexity of the mathematical translations performed.

One object of the invention, therefore, is to provide a serial binary-coded decimal complementer circuit which is selectively controllable either to shift an input number or to derive the complement thereof, thus equalizing the time delays for the two operations without the need for a special by-pass circuit.

Another object of the invention is to provide, for use in electronic binary-coded decimal digital computers, complementer circuits which produce the complement of a number in one integrated operation, without requiring the use of an adder.

A further object of the invention is to provide a 9's complementer circuit which may be utilized in combination with an adder circuit to perform operations of addition and subtraction or 10's-complementing of decimal numbers in the excess-zero binary code.

Yet another object of the invention is to provide serial complementer circuits constructed of flip-flops and gating circuits which achieve economy of circuit elements through full utilization of the information storage capabilities of the flip-flops.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention:

Figure 4:
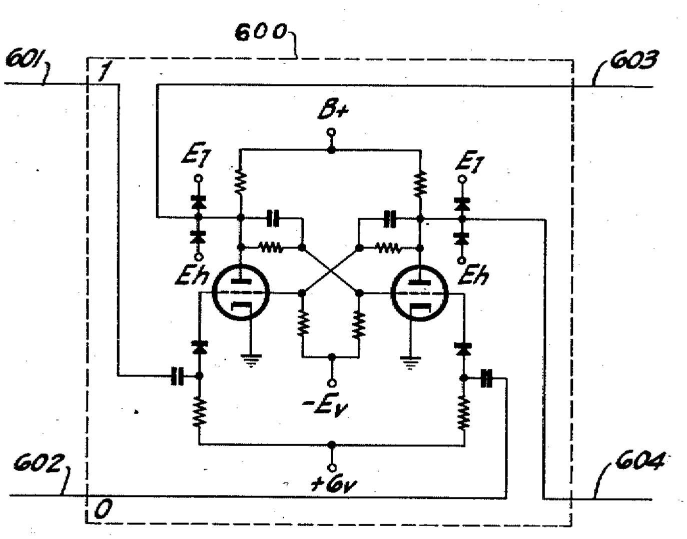
Fig. 4 is a circuit diagram of a flip-flop circuit suitable for use in the present invention.
Figure 4A:
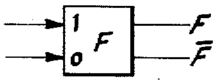
Figure 5A:
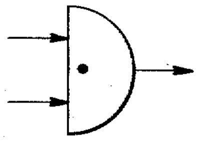
Figure 5:
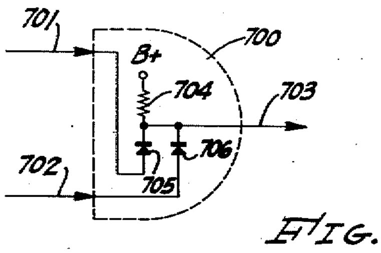
Figure 6A:
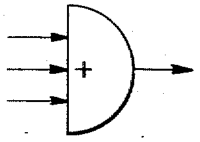
Figure 6:
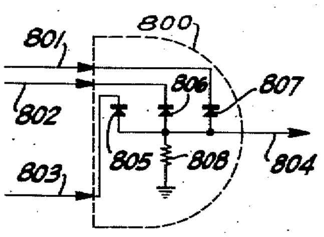

Fig. 4*a* is a symbolic representation of the flip-flop circuit of Fig. 4;

Fig. 5 is a circuit diagram of a two-input-terminal "and" circuit suitable for use in mechanizing the invention;

Fig. 5*a* is a symbolic representation of the "and" circuit of Fig. 5;

Fig. 6 is a circuit diagram of a three-input-terminal "or" circuit suitable for mechanizing the invention; and Fig. 6*a* is a symbolic representation of the "or" circuit of Fig. 6.

Figure 1:
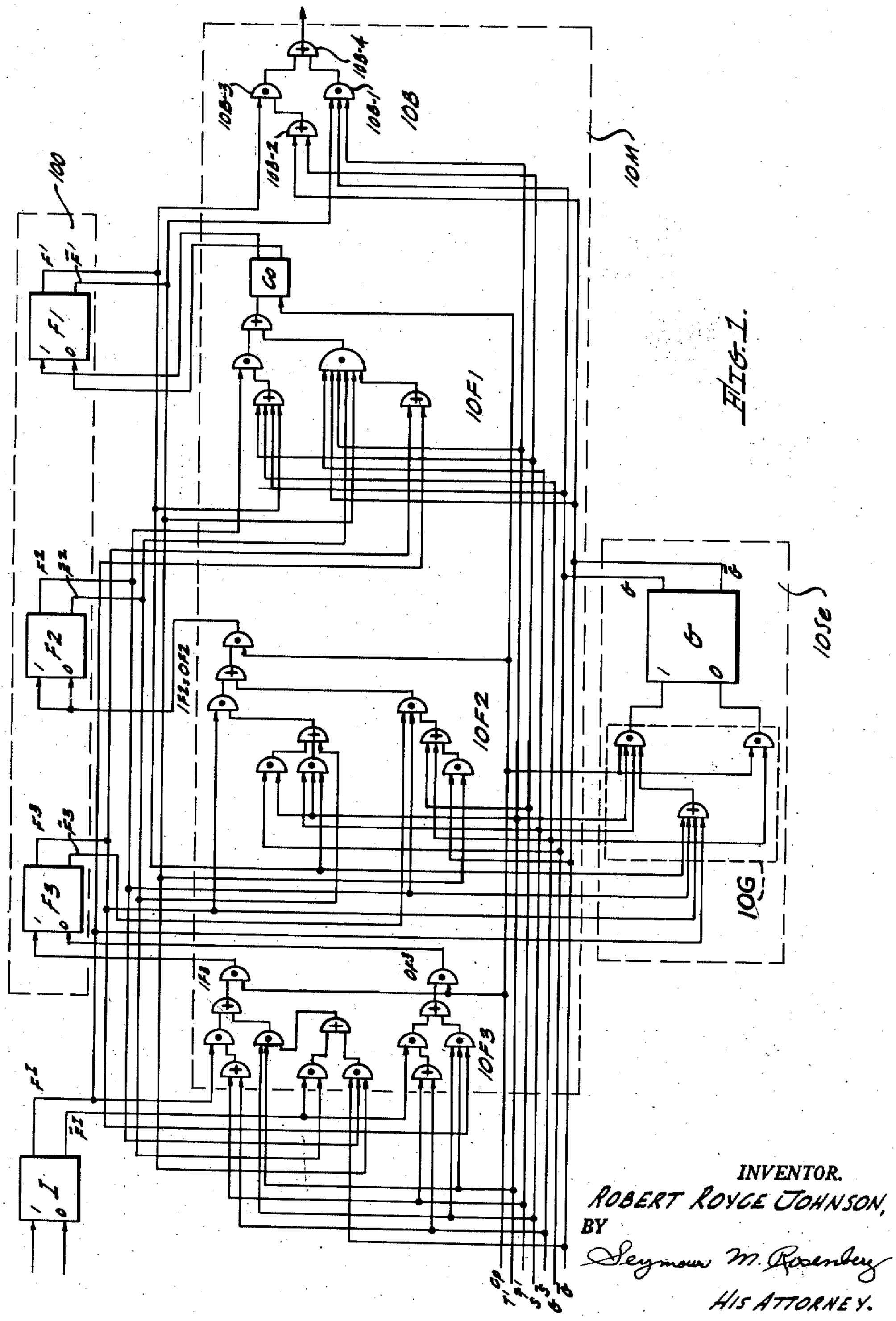
Fig. 1 is a schematic diagram of a direct 10's complementing circuit according to the present invention.

Reference is now made to Fig. 1 wherein there is shown an electronic complementer circuit for receiving a series of groups of binary signals $I_k^j$, respectively representing the digits of a decimal number in the order of increasing significance, where $j$ and $k$ indicate the binary and decimal digital positions, respectively. The circuit shifts signal groups $I_k^j$ at a constant rate, and is selectively operable in response to a control signal S to produce output signals $O_k^j$ representing the complement of the number. As shown in Fig. 1, the complementer circuit includes a shifting and converting register 100 which is actuable for converting each group of signals to represent the 9's complement of the corresponding digit of the number; a sequence control circuit **10S*e*, responsive to control signal S for generating a sequencing signal G, a first value of G indicating the period of operation prior to and during the reception of the first non-zero digit of the number; and a gating matrix 10M**, including a first group of gating circuits coupled to the register, responsive to control signal S and to the first value of sequencing signal G for producing signals representing the 10's complement of the first non-zero digit of the number, and a second group of gating circuits coupled to the register, responsive to control signal S for actuating the register to produce signals representing the 9's complements of succeeding digits of the number.

The circuit of Fig. 1 is operable to produce signals representing the 10's complement of a number in one integrated operation. The control signal S is a binary signal having either a 1-representing value or an 0-representing value. In some applications it may be convenient to utilize a pair of complementary shift-or-complement signals S and $\overline{S}$, where $\overline{S}$ has a 1-representing value when signals $I_k^j$ are to be shifted, and S has a 1-representing value when signals $I_k^j$ are to be shifted and converted into signals $O_k^j$. Register 100 includes flip-flops F3, F2, and F1. Signals $I_k^j$ are entered into the complementer 100 from a flip-flop I and progressively shifted therethrough, the output series $O_k^j$ corresponding to the input series $I_k^j$ after a time delay equivalent to three binary digits, the storage capacity of the register. A single flip-flop G and a gating circuit 10G for controlling its operation are included in sequence control circuit 10S*e*. The gating matrix 10M includes gating circuits 10F3, 10F2, and 10F1, for controlling the operation of the corresponding flip-flops F3, F2 and F1 during complementing, and a final gating circuit 10B.

As used herein, the term "shifting and converting register" refers to a register which may be employed for shifting, and which may also be employed for logically modifying the information during the shifting thereof. Thus a shifting and converting register includes a series of flip-flops or other bistable elements and a plurality of separate gating circuits, one for controlling each bistable element, each gating circuit being operable either to shift into the controlled bistable element a binary digit previously stored in the preceding element, or to cause a new binary digit, derived as a function of existing information, to be stored in the controlled element.

The logical translations performed during complementing by the shifting and converting register 100 and the gating matrix 10M, may be represented in the form of a truth table. Accordingly, reference is made to Table I, wherein bit values corresponding to the dit itself, for dit values ranging from (0) through (9).

TABLE I

| Dit Value | Binary Representation | | | | Binary-Coded 10's Complement | | | | Binary-Coded 9's Complement | | | |
|---|---|---|---|---|---|---|---|---|---|---|---|---|
| | $I_k^4$ | $I_k^3$ | $I_k^2$ | $I_k^1$ | $O_1^4$ | $O_1^3$ | $O_1^2$ | $O_1^1$ | $O_k^4$ | $O_k^3$ | $O_k^2$ | $O_k^1$(K>1) |
| (0) | 0 | 0 | 0 | 0 | 0 | 0 | 0 | 0 | 1 | 0 | 0 | 1 |
| (1) | 0 | 0 | 0 | 1 | 1 | 0 | 0 | 1 | 1 | 0 | 0 | 0 |
| (2) | 0 | 0 | 1 | 0 | 1 | 0 | 0 | 0 | 0 | 1 | 1 | 1 |
| (3) | 0 | 0 | 1 | 1 | 0 | 1 | 1 | 1 | 0 | 1 | 1 | 0 |
| (4) | 0 | 1 | 0 | 0 | 0 | 1 | 1 | 0 | 0 | 1 | 0 | 1 |
| (5) | 0 | 1 | 0 | 1 | 0 | 1 | 0 | 1 | 0 | 1 | 0 | 0 |
| (6) | 0 | 1 | 1 | 0 | 0 | 1 | 0 | 0 | 0 | 0 | 1 | 1 |
| (7) | 0 | 1 | 1 | 1 | 0 | 0 | 1 | 1 | 0 | 0 | 1 | 0 |
| (8) | 1 | 0 | 0 | 0 | 0 | 0 | 1 | 0 | 0 | 0 | 0 | 1 |
| (9) | 1 | 0 | 0 | 1 | 0 | 0 | 0 | 1 | 0 | 0 | 0 | 0 |

As the circuit of Fig. 1 is mechanized according to the excess-zero code, the *k*th dit of the dit of the number is represented by four bits $I_k^1$, $I_k^2$, $I_k^3$, and $I_k^4$, of respectively increasing significance. The output signal groups $O_1^j$ and $O_k^j$ ($k>1$) indicate, respectively, the bits representing 10's complemented digits, and the bits representing 9's complemented digits.

The 9's complement conversions, as shown in Table I, include the following conditions: $O_k^1$ is always the binary complement of $I_k^1$; $O_k^2$ has the same values as $I_k^2$; $O_k^3$ has the value 1 for dit values of 2 and 3, when $I_k^3$ is 0 and $I_k^2$ is 1, and also for dit values 4 and 5 when $I_k^3$ is 1 and $I_k^2$ is 0; whereas $O_k^4$ is 1 only when $I_k^4$, $I_k^3$, and $I_k^2$ are 0. These conditions may be expressed by the logical or Boolean Equations 1 as follows:

$$O_k^1=\overline{I}_k^1 \qquad (1)$$

$$O_k^2=I_k^2$$

$$O_k^3=\overline{I}_k^3.I_k^2+I_k^3.\overline{I}_k^2$$

and $$O_k^4=\overline{I}_k^4.\overline{I}_k^3.\overline{I}_k^2$$

where the dot (.) represents the logical multiplication or "and" function, the plus (+) is defined as the logical nonexclusive "or" function, and the bar (‒) indicates the complement of a signal. The conditions for forming the 10's complement translation, as shown in Table I, may in similar fashion be expressed by the Boolean Equations (2):

$$O_1^1=I_1^1 \qquad (2)$$

$$O_1^2=I_1^2.I_1^1+\overline{I}_1^2.\overline{I}_1^1.(I_1^3+I_1^4)$$

$$O_1^3=I_1^3.(\overline{I}_1^2+\overline{I}_1^1)+\overline{I}_1^3.I_1^2.I_1^1$$

and $$O_1^4=\overline{I}_1^4.\overline{I}_1^3.\overline{I}_1^2.I_1^1+\overline{I}_1^3.I_1^2.\overline{I}_1^1$$

Signal G may be defined as having the value 0 during 10's complementing and 1 during 9's complementing, and a complementary signal $\overline{G}$ may be provided. Thus, Boolean Expressions 3 for the combined functions may be derived as follows:

$$O_k^1=G.\overline{I}_k^1+\overline{G}.I_k^1 \qquad (3)$$

$$O_k^2=G.I_k^2+\overline{G}.[I_k^2.I_k^1+\overline{I}_k^2.\overline{I}_k^1.(I_k^3+I_k^4)]$$
$$=I_k^2.(G+I_k^1)+\overline{G}.\overline{I}_k^2.\overline{I}_k^1.(I_k^3+I_k^4)$$

$$O_k^3=G.(\overline{I}_k^3.I_k^2+I_k^3.\overline{I}_k^2)+\overline{G}.[I_k^3.(\overline{I}_k^2+\overline{I}_k^1)+\overline{I}_k^3.I_k^2.I_k^1]$$
$$=I_k^3.(G.\overline{I}_k^2+\overline{G}.\overline{I}_k^2+\overline{G}.\overline{I}_k^1)+\overline{I}_k^3.(G.I_k^2+\overline{G}.I_k^2.I_k^1)$$
$$=I_k^3.(\overline{I}_k^2+\overline{G}.\overline{I}_k^1)+\overline{I}_k^3.I_k^2.(G+I_k^1)$$

$$O_k^4=G.\overline{I}_k^4.\overline{I}_k^3.\overline{I}_k^2+\overline{G}.(\overline{I}_k^4.\overline{I}_k^3.\overline{I}_k^2.I_k^1+\overline{I}_k^3.I_k^2.\overline{I}_k^1)$$
$$=\overline{I}_k^4.\overline{I}_k^3.\overline{I}_k^2.(G+I_k^1)+\overline{G}.\overline{I}_k^3.I_k^2.\overline{I}_k^1$$

where *k* represents any digit of the number to be complemented.

Each flip-flop in the circuit of Fig. 1 includes a pair of output circuits for producing complementary output signals, and is also provided with a pair of input circuits for controlling the output stable state. Input signals applied during one time interval determine the output stable state during the next time interval.

The sequence of operations of the circuit of Fig. 1 may best be described by means of a chart or graph indicating the flow of information through the circuit as a function of time, and showing precisely the point in time and space at which each input bit is converted into, or replaced by, its corresponding output bit. As the group of bits representing each dit is applied serially, four time intervals are required for the group to flow past a specified point in the circuit; accordingly, a repeating cycle of voltage-level timing signals $T^1$, $T^2$, $T^3$, and $T^4$, having 1-representing values during successive time intervals, are required for controlling the bit translations. Reference is now made to Table II, indicating both the shifting and the complementing operations of the circuit of Fig. 1, plotted as functions of time intervals $T^1$, $T^2$, $T^3$, and $T^4$. Table II includes three binary digit groups corresponding to values of $k$ of 0, 1, and $k$ (here indicating a value greater than 1), which are respectively shifted, 10's complemented, and 9's complemented.

TABLE II

| | | | | I | F3 | F2 | F1 | B | G | S | | |
|---|---|---|---|---|---|---|---|---|---|---|---|---|
| $I_1^4$ | $I_1^3$ | $I_1^2$ | $I_1^1$ | $I_0^4$ | $I_0^3$ | $I_0^2$ | $I_0^1$ | $I_0^1$ | 0 | 0 | $T^1$ | Shift |
| | $I_1^4$ | $I_1^3$ | $I_1^2$ | $I_1^1$ | $I_0^4$ | $I_0^3$ | $I_0^2$ | $I_0^2$ | | | $T^2$ | |
| | | $I_1^4$ | $I_1^3$ | $I_1^2$ | $I_1^1$ | $I_0^4$ | $I_0^3$ | $I_0^3$ | | | $T^3$ | |
| | | | $I_1^4$ | $I_1^3$ | $I_1^2$ | $I_1^1$ | $I_0^4$ | $I_0^4$ | | | $T^4$ | |
| $I_k^4$ | $I_k^3$ | $I_k^2$ | $I_k^1$ | $I_1^4$ | $I_1^3$ | $I_1^2$ | $I_1^1$ | $O_1^1$ | 0 | 1 | $T^1$ | 10's |
| | $I_k^4$ | $I_k^3$ | $I_k^2$ | $I_k^1$ | $O_1^4$ | $O_1^3$ | $O_1^2$ | $O_1^2$ | | | $T^2$ | |
| | | $I_k^4$ | $I_k^3$ | $I_k^2$ | $I_k^1$ | $O_1^4$ | $O_1^3$ | $O_1^3$ | | | $T^3$ | |
| | | | $I_k^4$ | $I_k^3$ | $I_k^2$ | $I_k^1$ | $O_1^4$ | $O_1^4$ | | | $T^4$ | |
| | | | | $I_k^4$ | $I_k^3$ | $I_k^2$ | $I_k^1$ | $O_k^1$ | 1 | 1 | $T^1$ | 9's |
| | | | | | $O_k^4$ | $O_k^3$ | $O_k^2$ | $O_k^2$ | | | $T^2$ | |
| | | | | | | $O_k^4$ | $O_k^3$ | $O_k^3$ | | | $T^3$ | |
| | | | | | | | $O_k^4$ | $O_k^4$ | | | $T^4$ | |

In Table II, converted signals $O_k^4$, $O_k^3$, and $O_k^2$, $(k>0)$, appearing during $T^2$ on flip-flops F3, F2, and F1, respectively, must be formulated in the corresponding gating circuits during $T^1$ whereas signal B representing converted signals $O_k^1$ $(k>0)$ during $T^1$ is a function only of signals $I_k^1$ $(k>0)$ then existing on flip-flop F1. Thus, all bit conversions required during complementing are formulated during $T^1$, and at all other times the circuit shifts. During $T^1$, the circuit operation is controlled by signals S and G, S being 0 for shifting and 1 for complementing. By assigning to signal G the value 0 for shifting and for 10's complementing, and permitting it to have the value 1 during $T^1$ only for 9's complementing, the operations may be logically expressed by operation control symbols as follows:

$(\bar{T}^1+\bar{S})$, designating shifting,
$S.\bar{G}.T^1$, designating 10's complementing, and
$G.T^1$, designating 9's complementing It is apparent that if the external control signal S remains at the value 0, the shifting operation will continue indefinitely. When the signal S changes to 1 by a time $T^1$, 10's complementing will commence; if the first digit has a value other than 0 the gating circuit 10G becomes operative to change signal G to 1 by the next time $T^1$, whereas if the first digit is 0, signal G does not change and the 10's complement operation will be repeated.

The required mechanization of final gating circuit 10B may now be derived. From Table II it will be noted that, during shifting, the signal on flip-flop F1 is entered directly into gating circuit 10B, the output signal of which is designated therein as B. For 10's complementing $B=O_1^1$ and the signal on F1 is $I_1^1$; in the above discussion of Table I it is shown that $O_1^1=I_1^1$, hence only straight shifting is required. Signal $O_k^1$ is the complement of $I_k^1$, however, hence for 9's complementing B is the complement of the signal on F1. These relations are logically expressed as:

$$B=(\bar{T}^1+\bar{S}).F^1+S.\bar{G}.T^1.F^1+G.T^1.\bar{F}^1 \qquad (4)$$
$$=(\bar{G}+\bar{T}^1).F^1+G.T^1.\bar{F}^1$$

where $\bar{F}^1$ and $F^1$ signify the output signal and the complementary output signal, respectively, of flip-flop F1.

One type of flip-flop which may be utilized in this invention is the conventional flip-flop having 1 and 0 input circuits, and having the characteristic that pulses applied separately to the 1 and 0 input circuits set the flip-flop to stable states representing binary 1 and 0, respectively, while the simultaneous application of pulses to both input circuits triggers the flip-flop or causes it to change stable states. This type of flip-flop is utilized in this invention except where otherwise expressly indicated.

Reference is now made to Fig. 4 wherein a suitable form of flip-flop circuit is illustrated, enclosed within a dotted box 600. Input leads 601 and 602 correspond to the 1-input circuit and the 0-input circuit, respectively; and output leads 603 and 604 correspond to the primary and complementary output signals, respectively. It is not necessary to describe the circuit of Fig. 4 in detail since the identical circuit is shown and described in U. S. Patent No. 2,644,887 for "Synchronizing Generator," issued July 1, 1953, to A. E. Wolfe, Jr. In the referenced patent the flip-flop circuit is illustrated as Fig. *6a* and is described in the specification commencing at column 9, line 38. A symbolic representation of the flip-flop circuit of Fig. 4 is shown in Fig. *4a*.

As signal G must change from 0 to 1 by $T^1$ time following the deriving of the 10's complement of the first non-zero dit, gating circuit 10G may be mechanized to provide an input signal for the 1-input of flip-flop G as follows:

$$1G=S.T^1.(F^1+F^2+F^3+F^1) \qquad (5)$$

In order to return signal G to 0 at the end of the complemelting operation, the 0-input may be mechanized as:

$$0G=\bar{S} \qquad (6)$$

For completing the mechanization of the circuit of Fig. 1 the logical expressions for gating circuits 10F3, 10F2, and 10F1 will now be derived. First, it is necessary to understand the general form of equations which may be used to define flip-flop input signals. The discussion here is brief since the general theory of flip-flop control functions is discussed in considerable detail in copending U. S. patent applications Serial No. 327,567 for "Binary-Coded Flip-Flop Counters," by E. C. Nelson, filed December 23, 1952, and Serial No. 327,131 for "Binary-Coded Flip-Flop Counters," by R. R. Johnson, filed December 20, 1952, and which applications are assigned to the same assignee as the present invention.

Four different types of input functions may be defined for accomplishing the transition from the present stable state of a flip-flop. According to one function, the input signals are effectively shifted into the corresponding flip-flop so that the sequence of stable states of the flip-flop corresponds directly to the sequence of 1 and 0 signals applied to the 1-input circuit, the ouput signals being delayed one time interval after the input signals. As the value, 1 or 0, of the equation for the 1-input signal at any particular time must be made to correspond to the setting desired for the succeeding time interval, this function is designated as the "setting function."

According to a second type of defining equation the conditions for changing the flip-flop stable state are established. Thus, if the stable state is to remain the same from one bit time to the next, an 0 signal must be applied to both inputs, whereas if the stable state is to change, a 1 signal must be applied to both inputs. This function is therefore referred to as the "changing function."

In many situations it is desirable to separate the changing type of equation into two functions referred to hereafter as "partial changing functions," which separately define the signals for the 1 and 0 input circuits. The function for the 1-input circuit has the value 1 only when it is desired to change the flip-flop from an 0-representing state to a 1-representing state, and has the value 0 for all other conditions. Similarly, the function for the 0-input circuit has the value 0 except when the opposite transition is desired, when it has the value 1.

The partial changing functions may sometimes be simplified by omitting unnecessary restrictions, thus providing what are hereafter referred to as the "simplified partial changing functions." According to these functions, signal values are specified for the 1-input circuit only when that circuit controls the operation of the flip-flop, and are left unspecified for other conditions. Similarly, signal values for the 0-input circuit are left unspecified except for conditions where that circuit is controlling. Where signal value are not specified, any convenient combination of 1's and 0's may be used.

Input signals required in accordance with the four types of functions just described may be more clearly understood by reference to Table III, wherein the symbol F denotes the present stable state of the output circuit of a flip-flop; F′ indicates the stable state which is desired; and 1F and 0F respectively indicate the 1-input signal and the 0-input signal which are presently required. It will be noted that Table III shows the input signals 1F and 0F, according to each of the four types of functions, for the four possible transitions, F to F′. Accordingly, for the setting function, 1F is always the same as F′; for the changing function, $1F=0F$, the signal being 1 when F and F′ are different, indicating a change of state is required, and being 0 when F and F′ are the same; and for the partial changing functions, 1F is 0 except when the transition 0-to-1 is required, and 0F is 0 except when the transition 1-to-0 is required. For the simplified partial changing functions, only one of the input signals 1F and 0F is specified for each transition F to F′; signal 1F is controlling when F is 0 and signal 0F is controlling when F is 1, each controlling signal being specified the same as for the partial changing functions.

TABLE III

*Flip-flop functions*

| | | Setting Function | Changing Function | Partial Changing Functions | | Simplified Partial Changing Functions | |
|---|---|---|---|---|---|---|---|
| F | F′ | $1F=\overline{0F}$ | 1F=0F | 1F | 0F | 1F | 0F |
| 0 | 0 | 0 | 0 | 0 | 0 | 0 | |
| 0 | 1 | 1 | 1 | 1 | 0 | 1 | |
| 1 | 0 | 0 | 1 | 0 | 1 | | 1 |
| 1 | 1 | 1 | 0 | 0 | 0 | | 0 |

Table III is particularly useful for determining input signals required during complementing, when one signal series appearing on one flip-flop must be converted into a different series appearing on a succeeding flip-flop of the register. Thus, input signals for the latter flip-flop may, if convenient, be mechanized as functions of a number of other signals existing in the circuit at the time.

During shifting, however, the only requirement is that the signal series be shifted from one flip-flop to the next, hence the desired state F′ always coincides with the signal of the preceding flip-flop. Referring again to Table III, it is apparent that input signals according to each of the four functions may be expressed as logical shifting functions of the signals F and F′. Accordingly, these shifting functions have been set forth in Table III*a*. It will be noted from Table III*a* that the shifting functions according to the simplified partial changing function are not distinct, but may be chosen to coincide with the shifting function either for the setting function, or for the partial changing function.

**TABLE III*a***

*Flip-flop shifting functions*

| | |
|---|---|
| Setting function | $1F=\overline{0F}=F'$. |
| Changing function | $1F=0F=\overline{F}.F'+F.\overline{F'}$. |
| Partial changing functions | $1F=\overline{F}.F'$. |
| | $0F=F.\overline{F'}$. |
| Simplified partial changing functions | $1F=F'$, or $\overline{F}.F'$. |
| | $0F=\overline{F'}$, or $F.\overline{F'}$ |

It is apparent that gating circuits 10F3, 10F2, and 10F1, for providing input signals to the corresponding flip-flops of the circuit of Fig. 1, may be mechanized in accordance with any desired combination of the flip-flop functions just described. It follows from the definitions of the functions that mechanization is achieved, for the changing function, by applying a single signal to both input circuits simultaneously; and for the partial changing and simplified partial changing functions, by applying signal 1F to the 1-input circuit, and signal 0F to the 0-input circuit. Other methods are required, however, for the setting function.

The setting function may be mechanized by applying the signal 1F to an overriding flip-flop, the output circuit of which then becomes set to the stable state corresponding to the input signal for the preceding time interval. In lieu of an overriding flip-flop, a triggering circuit may be incorporated into one input circuit of a conventional flip-flop, as described in copending U. S. patent application Serial No. 245,737 for "Triggering Networks for Flip-Flop Circuits," by Daniel L. Curtis, filed September 8, 1951, and assigned to the same assignee as this application. Another method of mechanizing the setting function is to apply the signal 1F to a network which in turn provides the signal 1F for application to the 1-input circuit of a conventional flip-flop, and the signal $0F=\overline{1F}$ for application to the 0-input circuit. Such a network is described in copending U. S. patent application Serial No. 308,045 for "Complementary Signal Generating Networks," by Daniel L. Curtis, filed September 5, 1952, and assigned to the same assignee as this application.

In order to demonstrate more specifically the variety of mechanizations which may be achieved, logical expressions for gating circuit 10F1 will be derived according to each of the four types of flip-flop functions shown in Tables III and III*a*. Input signal requirements during complementing will be considered first. Accordingly, reference is made to Table IV wherein are shown the input signal requirements according to the setting, changing, partial changing, and simplified partial changing functions, for flip-flop F1 during the correction interval $T^1$. Table IV provides separate tabulations for the 10's complement, designated as $G=0$, and for the 9's complement, designated as $G=1$. The symbols St., Ch., P. Ch., and S. P. Ch., indicate the setting, changing, partial changing, and simplified partial changing functions, respectively.

Table IV includes two basic data columns designated as $F^1(T^1)$ and $F^1(T^2)$, corresponding to the stable states of flip-flop F1 during time intervals $T^1$ and $T^2$, respectively, and corresponding also to the variables F and F′ of Table III. By referring to Table II it may be ascertained that signals $F^1(T^1)$ and $F^1(T^2)$ of Table IV also correspond to signals $I_1^1$ and $O_1^2$, respectively, during 10's complementing, and to signals $I_k^1$ and $O_k^2$, respectively, during 9's complementing. Table IV also includes respective data columns for input signals $1F1=\overline{0F1}$, for the setting functions; $1F1=0F1$, for the changing functions; 1F1, 0F1, for the partial changing functions; and 1F1, 0F1, for the simplified partial changing functions. All of these input signals are derived from the two basic data columns $F^1(T^1)$ and $F^1(T^2)$, in accordance with Table III. For example, for each transition or conversion where $F^1(T^1)$ is 0 and $F^1(T^2)$ is 1, 1F1 is 1 according to each of the functions; where $F^1(T^1)$ is 0 and $F^1(T^2)$ is 0, 1F1 is 0 according to each of the functions; and where $F^1(T^1)$ is 1 and $F^1(T^2)$ is 0, 1F1 is 0 according to the setting and partial changing functions, is 1 according to the changing function, and is left unspecified according to the simplified partial changing function.

TABLE IV

*Input requirements for flip-flop F1 during $T^1$*

| $F^I$ | $F^3$ | $F^2$ | $F^1(T^1)$ | $F^1(T^2)$ | St. $1F1=\overline{0F1}$ | Ch. $1F1=0F1$ | P. Ch. | | S. P. Ch. | |
|---|---|---|---|---|---|---|---|---|---|---|
| | | | | | | | 1F1 | 0F1 | 1F1 | 0F1 |
| G=0 $I_1^4$ | $I_1^3$ | $I_1^2$ | $I_1^1$ | $O_1^2$ | | | | | | |
| 0 | 0 | 0 | 0 | 0 | 0 | 0 | 0 | 0 | 0 | |
| 0 | 0 | 0 | 1 | 0 | 0 | 1 | 0 | 1 | | 1 |
| 0 | 0 | 1 | 0 | 0 | 0 | 0 | 0 | 0 | 0 | |
| 0 | 0 | 1 | 1 | 1 | 1 | 0 | 0 | 0 | | 0 |
| 0 | 1 | 0 | 0 | 1 | 1 | 1 | 1 | 0 | 1 | |
| 0 | 1 | 0 | 1 | 0 | 0 | 1 | 0 | 1 | | 1 |
| 0 | 1 | 1 | 0 | 0 | 0 | 0 | 0 | 0 | 0 | |
| 0 | 1 | 1 | 1 | 1 | 1 | 0 | 0 | 0 | | 0 |
| 1 | 0 | 0 | 0 | 1 | 1 | 1 | 1 | 0 | 1 | |
| 1 | 0 | 0 | 1 | 0 | 0 | 1 | 0 | 1 | | 1 |
| G=1 $I_k^4$ | $I_k^3$ | $I_k^2$ | $I_k^1$ | $O_k^2$ | | | | | | |
| 0 | 0 | 0 | 0 | 0 | 0 | 0 | 0 | 0 | 0 | |
| 0 | 0 | 0 | 1 | 0 | 0 | 1 | 0 | 1 | | 1 |
| 0 | 0 | 1 | 0 | 1 | 1 | 1 | 1 | 0 | 1 | |
| 0 | 0 | 1 | 1 | 1 | 1 | 0 | 0 | 0 | | 0 |
| 0 | 1 | 0 | 0 | 0 | 0 | 0 | 0 | 0 | 0 | |
| 0 | 1 | 0 | 1 | 0 | 0 | 1 | 0 | 1 | | 1 |
| 0 | 1 | 1 | 0 | 1 | 1 | 1 | 1 | 0 | 1 | |
| 0 | 1 | 1 | 1 | 1 | 1 | 0 | 0 | 0 | | 0 |
| 1 | 0 | 0 | 0 | 0 | 0 | 0 | 0 | 0 | 0 | |
| 1 | 0 | 0 | 1 | 0 | 0 | 1 | 0 | 1 | | 1 |

Table IV also includes data columns $F^I$, $F^3$, and $F^2$, which, as may be ascertained by reference to Tables I and II, correspond to the signal on flip flops I, F3, and F2, respectively, during time $T^1$. The required input signals 1F1, 0F1, for flip flop F1 may therefore be obtained as functions of these signals. For example, during 10's complementing, the signal $1F1=\overline{0F1}$ according to the setting function is 1 when $F^2$ and $F^1$ are 1, or when $F^2$ and $F^1$ are 0 and either $F^3$ or $F^I$ is 1. This may be expressed as:

$$1F1=\overline{0F1}=F^2.F^1+\bar{F}^2.\bar{F}^1.(F^3+F^I) \qquad (7)$$

Similarly, the input signal during 10's complementing according to the changing function may be expressed as:

$$1F1=0F1=\bar{F}^2.(F^I+F^3+F^1) \qquad (8)$$

the input signals according to the partial changing functions as:

$$1F1=\bar{F}^2.\bar{F}^1.(F^3+F^I)$$

and $$0F1=\bar{F}^2.F^1 \qquad (9)$$

and the input signals according to the simplified partial changing functions as:

$$1F1=F^3.\bar{F}^2+F^I$$

and $$0F1=\bar{F}^2 \qquad (10)$$

The input signals required by flip-flop F1 for 9's complementing during $T^1$ may also, with the aid of Table IV, be expressed as functions of signals existing on the other flip-flops of the register. Thus, for the setting function:

$$1F1=\overline{0F1}=F^2 \qquad (11)$$

the input signal according to the changing function may be expressed as:

$$1F1=0F1=F^2.\bar{F}^1+\bar{F}^2.F^1 \qquad (12)$$

the input signals according to the partial changing functions as:

$$1F1=F^2.\bar{F}^1 \qquad (13)$$

and $$0F1=\bar{F}^2.F^1$$

and the input signals according to the simplified partial changing functions as:

$$1F1=F^2 \qquad (14)$$

and $$0F1=\bar{F}^2$$

It may be noted that these functions coincide with the shifting functions of Table III*a*, since the second bit $O_K^2$ of a 9's-complemented digit is identical to the second bit $I_K^2$ of the digit itself, for all digit values.

Complete expressions for the mechanization of gating circuit 10F1 may now be derived. For each operation of shifting, 10's complementing, and 9's complementing, the expression for the signal conversion or translation to be performed may be combined with its corresponding operation control symbol. It is apparent that the appropriate expressions for flip-flop F1 for shifting may be obtained from the generic expressions of Table III*a* by the substitution of $F^2$ for $F^1$, and $F^1$ for F. Thus, for the setting function:

$$1F1=\overline{0F1}=(\bar{T}^1+\bar{S}).F^2+S.\bar{G}.T^1.[F^2.F^1+ F^2.\bar{F}^1.(F^3+F^I)]+G.T^1.F^2 \qquad (15)$$
$$=F^2.(\bar{T}^1+\bar{S}+G+F^1)+S.\bar{G}.T^1.\bar{F}^2.\bar{F}^1.(F^3+F^I)$$

for the changing function:

$$1F1= 0F1=(\bar{T}^1+\bar{S}).(F^2.\bar{F}^1+\bar{F}^2.F^1)+S.\bar{G}.T^1.\bar{F}^2.(F^I+ F^3+F^1)+G.T^1.(F^2.\bar{F}^1+\bar{F}^2.F^1) \qquad (16)$$
$$=\bar{F}^2.F^1+(\bar{T}^1+\bar{S}+G).F^2.\bar{F}^1+S.\bar{G}.T^1.\bar{F}^2.(F^I+F^3)$$

for the partial changing functions:

$$1F1=(\bar{T}^1+\bar{S}).F^2.\bar{F}^1+S.\bar{G}.T^1.\bar{F}^2.\bar{F}^1.(F^3+F^I)+G.T^1.F^2.\bar{F}^1 \quad (17)$$
$$=(\bar{T}^1+\bar{S}+G).F^2.\bar{F}^1+S.\bar{G}.T^1.\bar{F}^2.\bar{F}^1.(F^3+F^I)$$

and $$0F1=(\bar{T}^1+\bar{S}).\bar{F}^2.F^1+S.\bar{G}.T^1.\bar{F}^2.F^1+G.T^1.\bar{F}^2.F^1$$
$$=\bar{F}^2.F^1$$

from which, by combining with the corresponding operation control symbols, the total expression becomes:

$$1F2=0F2=(\bar{T}^1+\bar{S}).F^3.\bar{F}^2+\bar{F}^3.F^2)+S.\bar{G}.T^1.[F^3.(\bar{F}^2+F^1)+\bar{F}^3.F^2.\bar{F}^1]+G.T^1.F^3 \quad (22)$$
$$=F^3.(G.T^1+S.T^1.F^1+\bar{F}^2)+\bar{F}^3.F^2.(\bar{T}^1+\bar{S}+\bar{G}.\bar{F}^1)$$

From Table V also, the 10's complementing functions for flip-flop F3 are:

TABLE V

*Input requirements for flip-flops F2 and F3 during $T^1$*

| $F^1$ | $F^3$ | $F^2$ | $F^1$ | $F^3(T^2)$ | $F^2(T^2)$ | 1F3 | 0F3 | 1F2=0F2 |
|---|---|---|---|---|---|---|---|---|
| G=0 $I_1^4$ | $I_1^3$ | $I_1^2$ | $I_1^1$ | $O_1^4$ | $O_1^3$ | | | |
| 0 | 0 | 0 | 0 | 0 | 0 | 0 | | 0 |
| 0 | 0 | 0 | 1 | 1 | 0 | 1 | | 0 |
| 0 | 0 | 1 | 0 | 1 | 0 | 1 | | 1 |
| 0 | 0 | 1 | 1 | 0 | 1 | 0 | | 0 |
| 0 | 1 | 0 | 0 | 0 | 1 | | 1 | 1 |
| 0 | 1 | 0 | 1 | 0 | 1 | | 1 | 1 |
| 0 | 1 | 1 | 0 | 0 | 1 | | 1 | 0 |
| 0 | 1 | 1 | 1 | 0 | 0 | | 1 | 1 |
| 1 | 0 | 0 | 0 | 0 | 0 | 0 | | 0 |
| 1 | 0 | 0 | 1 | 0 | 0 | 0 | | 0 |
| G=1 $I_k^4$ | $I_k^3$ | $I_k^2$ | $I_k^1$ | $O_k^4$ | $O_k^3$ | | | |
| 0 | 0 | 0 | 0 | 1 | 0 | 1 | | 0 |
| 0 | 0 | 0 | 1 | 1 | 0 | 1 | | 0 |
| 0 | 0 | 1 | 0 | 0 | 1 | 0 | | 0 |
| 0 | 0 | 1 | 1 | 0 | 1 | 0 | | 0 |
| 0 | 1 | 0 | 0 | 0 | 1 | | 1 | 1 |
| 0 | 1 | 0 | 1 | 0 | 1 | | 1 | 1 |
| 0 | 1 | 1 | 0 | 0 | 0 | | 1 | 1 |
| 0 | 1 | 1 | 1 | 0 | 0 | | 1 | 1 |
| 1 | 0 | 0 | 0 | 0 | 0 | 0 | | 0 |
| 1 | 0 | 0 | 1 | 0 | 0 | 0 | | 0 |

and for the simplified partial changing functions:

$$1F1=(\bar{T}^1+\bar{S}).F^2+S.\bar{G}.T^1.(F^3.\bar{F}^2+F^I)+G.T^1.F^2$$
$$=(\bar{T}^1+\bar{S}+G).F^2+S.\bar{G}.T^1.(F^3.\bar{F}^2+F^I) \quad (18)$$

and $$0F1=(\bar{T}^1+\bar{S}).\bar{F}^2+S.\bar{G}.T^1.\bar{F}^2+G.T^1.\bar{F}^2=\bar{F}^2$$

In the circuit of Fig. 1, gating circuit 10F1 is mechanized according to the setting function, whereas gating circuits 10F2 and 10F3 are mechanized according to the changing function and the simplified partial changing functions, respectively. In order to derive expressions for the mechanization of gating circuits 10F2 and 10F3 reference is now made to Table V, wherein the required input signals 1*F*2=0*F*2, for flip-flop F2, and 1F3, 0F3, for flip-kop F3, are shown in tabular form. Table V itself is derived in the same manner as previously explained for Table IV, and it is apparent that expressions for the required input signals may be formulated in terms of the signals existing on the other flip-flops of the register, as was done in connection with Table IV.

From Table V, the 10's complementing function for flip-flop F2 is:

$$1F2=0F2=F^3.(\bar{F}^2+F^1)+\bar{F}^3.F^2.\bar{F}^1 \quad (19)$$

for 9's complementing is:

$$1F2=0F2=F^3 \quad (20)$$

and the expression for shifting, obtained from Table III*a* by the substitution of $F^3$ for F′, and of $F^2$ for F, is:

$$1F2=0F2=F^3.\bar{F}^2+\bar{F}^3.F^2 \quad (21)$$

$$1F3=\bar{F}^I.\bar{F}^2.F^1+F^2.\bar{F}^1 \quad (23)$$
$$0F3=F^3$$

the functions for 9's complementing are:

$$1F3=\bar{F}^I.\bar{F}^2 \quad (24)$$
$$0F3=F^3\text{, or, }0F3=\overline{F^I}$$

and the expressions for shifting, obtained from Table III*a* by the substitution of $F^I$ for F′, and of $F^3$ for F, become:

$$1F3=F^I \quad (25)$$
$$0F3=\bar{F}^I$$

from which, by combining with the corresponding operation symbols, the expressions for gating circuit 10F3 become:

$$1F3=(\bar{T}^1+\bar{S}).F^I+S.\bar{G}.T^1.(\bar{F}^I.F^2.F^1+F^2.\bar{F}^1)+G.T^1.\bar{F}^I.\bar{F}^2$$
$$=(\bar{T}^1+\bar{S}).F^I+S.T^1.(\bar{F}^I.\bar{F}^2+\bar{G}.F^2.\bar{F}^1) \quad (26)$$
$$0F3=(\bar{T}^1+\bar{S}).\bar{F}^I+S.\bar{G}.T^1.F^3+G.T^1.F^3$$
$$=(\bar{T}^1+\bar{S}).\bar{F}^I+S.T^1.F^3$$

For synchronizing the operation of the circuit of Fig. 1, a clock pulse *cp* generated by an external source may be applied at the end of each bit time $T^1$, $T^2$, $T^3$, and $T^4$. Including the clock pulse *cp* as a final "and" condition in each flip-flop input signal, the final mechanization functions for the circuit of Fig. 1 then become:

$$(10G)\quad \begin{aligned} 1G &= S.T^1.(F^1+F^2+F^3+F^I).cp \\ 0G &= \overline{S}.cp \end{aligned} \qquad (27)$$

$$(10B)\quad B = (\overline{G}+\overline{T}^1).F^1+G.T^1.\overline{F}^1$$

$$(10F1)\quad 1F1=\overline{0F1}=[F^2.(\overline{T}^1+\overline{S}+G+F^1)+ S.\overline{G}T^1.\overline{F}^2.\overline{F}^1.(F^3+F^I)].cp$$

$$(10F2)\quad 1F2=0F2=[F^3.(G.T^1+S.T^1.F^1+\overline{F}^2)].cp \quad \overline{F}^3.F^2.(\overline{T}^1+\overline{S}+\overline{G}.\overline{F}^1)].cp$$

$$(10F3)\quad 1F3=[(\overline{T}^1+\overline{S}).F^I+S.T^1.(\overline{F}^I.\overline{F}^2+\overline{G}.F^2.\overline{F}^1)].cp$$

and $$0F3=[(\overline{T}^1+\overline{S}).\overline{F}^I+S.T^1.F^3].cp$$

where the dot (.) represents the logical "and" function and the plus (+) the logical non-exclusive "or" function.

In the circuit of Fig. 1, each "and" function is provided by an "and" circuit and each "or" function by an "or" circuit. For example, in gating circuit 10B, the "and" function $G.T^1.\overline{F}^1$ in Equation 10B, above, is provided by "and" circuit 10B–1, responsive to signals G, $T^1$, and $\overline{F}^1$ applied to separate input terminals, for producing a 1-representing output signal when signals G, $T^1$, "and" $\overline{F}^1$ are 1-representing signals. The "or" function $(\overline{G}+\overline{T}^1)$ is provided by "or" circuit 10B–2, responsive to signals $\overline{G}$ and $\overline{T}^1$ applied to separate input terminals, for producing a 1-representing output signal when either "or" both of signals $\overline{G}$ and $\overline{T}^1$ is a 1-representing signal. This "or" function is combined with signal $F^1$ in "and" circuit 10B–3 to produce the function $(\overline{G}+\overline{T}^1).F^1$. Finally, the functions $(\overline{G}+\overline{T}^1).F^1$ and $G.T^1.F^1$ are combined in "or" circuit 10B–4 to produce the signal B.

"And" and "or" circuits are now so well known in the computer art that it should not be necessary to describe such circuits in detail in this application. Examples of such circuits are shown on pages 37 to 45 of "High-Speed Computing Devices" by Engineering Research Associates, published in 1950 by McGraw-Hill Book Company, Inc., New York and London, and in an article entitled "Diode coincidence and mixing circuits in digital computers" by Tung Chang Chen, in volume 38 of the "Proceedings of the Institute of Radio Engineers," on pages 511 through 514.

Reference is now made, merely for the sake of completeness, to Figs. 5, 5*a*, 6 and 6*a* illustrating forms of "and" and "or" circuits suitable for use in mechanizing the present invention. An "and" circuit having two input terminals is illustrated in Fig. 5, while the symbolic representation thereof is shown in Fig. 5*a*. An "or" circuit having three input terminals is illustrated in Fig. 6, the symbolic representation being shown in Fig. 6*a*. It is not necessary to describe these circuits in detail since they are shown and described in the Wolfe patent above referred to. An "and" circuit identical to that of Fig. 5 is shown in Fig. 9*c* of the referenced patent as a gate 60; and an "or" circuit identical to that of Fig. 6 is illustrated in Fig. 13*c* of the referenced patent as a gate $(E^4)'$.

As the application of clock-pulse *cp* is a final "and" condition for all flip-flop input signals, it may be combined in a final "and" circuit which is included specifically for that purpose. On the other hand, it may be preferable to employ as the final gating circuit a combined "and" and "or" circuit of the type described in copending U. S.

patent application No. 2,762,936, Serial No. 327,133, for "Diode, Pulse Gating Circuits," by Richard D. Forrest, filed December 20, 1952, and assigned to the same assignee as the present application.

It will be noted that a complementary signal generating network *Co*, of the type described in the abovementioned copending application Serial No. 308,045 by Daniel L. Curtis, is interposed between gating circuit 10F1 and flip-flop F1, for developing signals 1F1 and 0F1.

Whereas specific mechanizations of the gating circuits are shown in Fig. 1, the particular mechanizations have been selected primarily for purposes of illustration, and as previously pointed out a wide variety of other mechanizations are possible. For example, the mechanization of gating circuit 10F2 according to the simplified partial changing functions would provide a saving of 6 diodes over the mechanization shown.

The operation of the circuit of Fig. 1 has been previously illustrated by Table II, in terms of the conversions of input signals $I_k^j$ into output signals $O_k^j$. A specific illustration in terms of numerical signal values is presented in Table VI, below, wherein there is shown the shifting of the last digit 7 of one decimal number, and the complementing of the first three digits 580 of another decimal number. The symbols employed in Table VI to represent the reading flip-flop I, the flip-flops of the register, the final gating matrix 10B, signals S and G, and the timing signals, are identical to those of Table II. At the first time $T^1$ the digit 7 to be shifted is fully entered into the register, and at succeeding times $T^1$ the digits 0, 8, and 5, respectively, representing the number 580 to be complemented, are fully entered into the register. Accordingly, signal S is 0 at the first time $T^1$ but changes to 1 by the second time $T^1$, actuating the circuit to complement the digits 0, 8, and 5. Signal G is 0 during the shifting of the digit 7 and remains 0 during the complementing of the zero-valued digit, but the entry of the digit 8 into the register causes G to change to 1 by the following time $T^2$. The digit 5 is then 9's complemented in response to $S=1$ and $G=1$. It is therefore apparent that, during complementing, the binary representation of the applied number 580 is converted to the binary representation of the complementary number, 420.

TABLE VI

| I | F3 | F2 | F1 | B | G | S | |
|---|---|---|---|---|---|---|---|
| 5 8 0 | | | 7 | | | | |
| 010110000000 | 1 | 1 | 1 | 1 | 0 | 0 | $T^1$ |
| 010110000000 | 0 | 1 | 1 | 1 | 0 | 0,1 | $T^2$ |
| 01011000000 | 0 | 0 | 1 | 1 | 0 | 0,1 | $T^3$ |
| 0101100000 | 0 | 0 | 0 | 0 | 0 | 0,1 | $T^4$ |
| 010110000 | 0 | 0 | 0 | 0 | 0 | 1 | $T^1$ |
| 01011000 | 0 | 0 | 0 | 0 | 0 | 1 | $T^2$ |
| 0101100 | 0 | 0 | 0 | 0 | 0 | 1 | $T^3$ |
| 010110 | 0 | 0 | 0 | 0 | 0 | 1 | $T^4$ |
| 01011 | 0 | 0 | 0 | 0 | 0 | 1 | $T^1$ |
| 0101 | 0 | 0 | 1 | 1 | 1 | 1 | $T^2$ |
| 010 | 1 | 0 | 0 | 0 | 1 | 1 | $T^3$ |
| 01 | 0 | 1 | 0 | 0 | 1 | 1 | $T^4$ |
| 0 | 1 | 0 | 1 | 0 | 1 | 1 | $T^1$ |
| | 0 | 1 | 0 | 0 | 1 | 1 | $T^2$ |
| | | 0 | 1 | 1 | 1 | 1 | $T^3$ |
| | | | 0 | 0 | 1 | 1 | $T^4$ |

Figure 2:
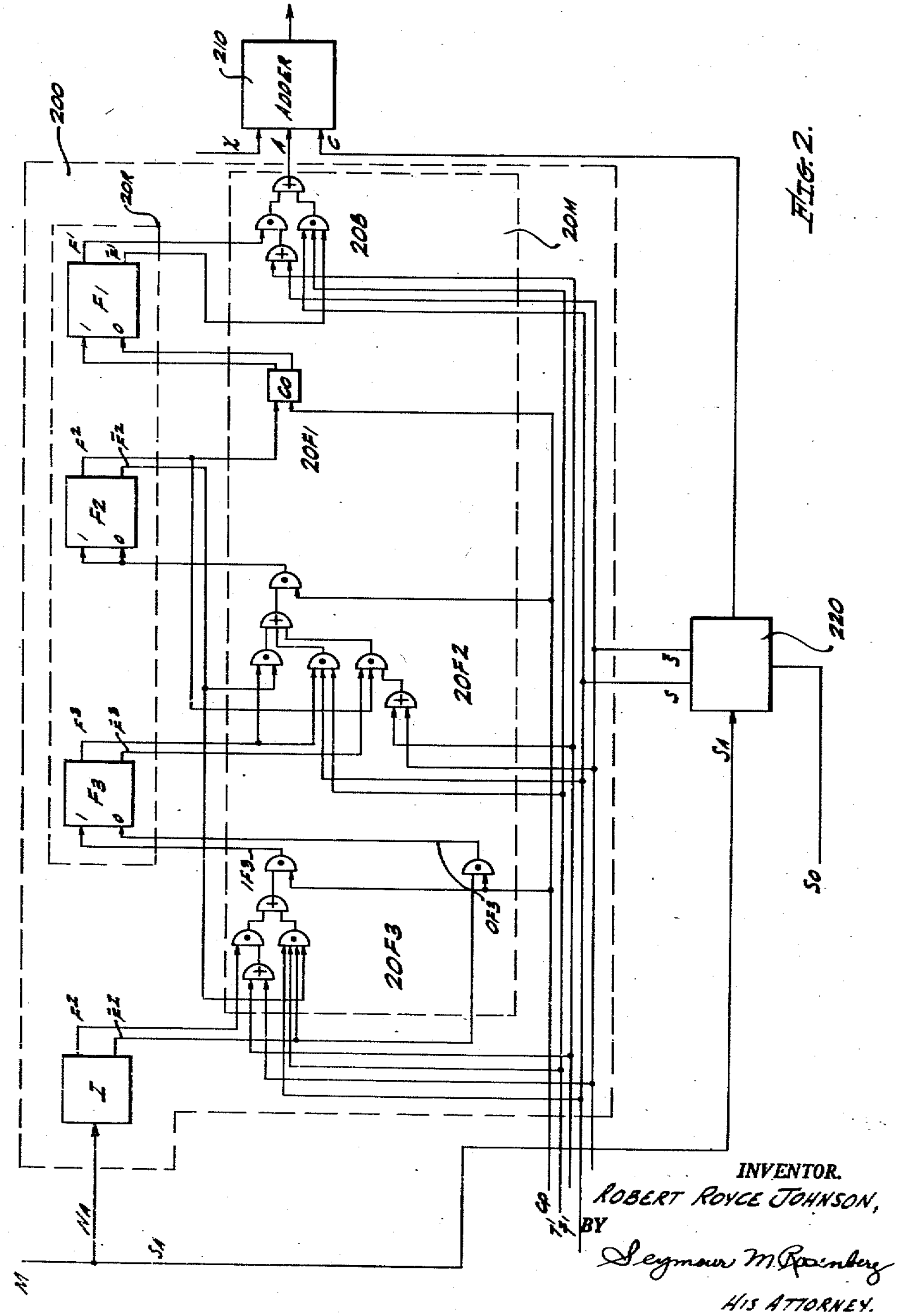
Fig. 2 is a schematic diagram of a 9's complementer circuit, showing a method of utilization with an adder circuit, according to the present invention.

Reference is now made to Fig. 2 wherein there is shown a second embodiment of the present invention, for producing the 10's complement of a number by first deriving the 9's complement and then adding 1 in the least significant digital place. The circuit of Fig. 2 includes a 9's complementer circuit 200 coupled to one input terminal of an adder circuit 210. The 9's complementer is selectively operable, in response to a signal S generated by a shift-or-complement control circuit 220, to shift applied input signals $I_K^J$ representing a decimal number when S is 0, and to produce output signals $O_K^J$ representing the 9's complement of the number when S is 1. Adder 210 includes a carry circuit, not shown, which is responsive to the 1-representing value of signal S to generate a first decimal carry signal, and which is responsive to signals $O_K^J$ and the first carry signal to produce further carry signals as required. Thus, when S is 1, adder 210 receives signals $O_K^J$ and produces signals representing the 10's complement of the number. In the 9's complementer circuit of Fig. 2, a shifting and converting register 20R is identical to register 100 of Fig. 1, and a flip-flop I is again the source of input signals. A gating matrix 20M is 9's complementer 200, corresponding to gating matrix 10M of Fig. 1, includes gating circuits 20F3, 20F2, and 20F1, for providing input signals to the corresponding flip-flops, and a final gating circuit 20B.

The 9's complementer of Fig. 2 may be readily derived from the circuit of Fig. 1 by omitting the logical circuitry for forming 10's complements. Thus, in the equations for Fig. 1, the 10's complement term $S.\overline{G}.T^1$ may be omitted, and the remaining operations may be represented by the symbols:

$(\overline{T}^1+\overline{S})$, for shifting, and $S.T^1$, for 9's complementing, and the revised equations then become:

$$(20B)\ B\ =(\overline{T}^1+\overline{S}).F^1+S.T^1.\overline{F}^1$$

$$(20F1)1F1=\overline{0F1}=[(\overline{T}^1+\overline{S}).F^2+S.T^1.F^2].cp=F^2.cp$$

$$(20F2)1F2=0F2=[(\overline{T}^1+\overline{S}).(F^3.\overline{F}^2+\overline{F}^3.F^2)+S.T^1.F^3].cp$$

$$=[F^3.\overline{F}^2+F^3.S.T^1+\overline{F}^3.F^2.(\overline{T}^1+\overline{S})].cp$$

$$(20F3)1F3=[(\overline{T}^1+\overline{S}).F^I+S.T^1.\overline{F}^I.\overline{F}^2].cp \qquad (28)$$

$$0F3=[(\overline{T}^1+\overline{S}).\overline{F}^I+S.T^1.\overline{F}^I].cp=\overline{F}^I.cp$$

and as G no longer appears in the above equations, flip-flop G and its associated gating circuit may be omitted.

The details of adder circuit 210 are not shown as it is not a part of the present invention. One adder which may be used is of the general type described in the above-mentioned copending application Serial No. 322,665 by Nelson. Adder 210 is shown by way of example, as a two-input adder, having input circuits designated A and X for receiving numbers A and X, respectively, to be added or subtracted, and another input circuit C coupled to control circuit 220.

The combination of 9's complementer and adder, as shown in Fig. 2, may be utilized for operations of addition, subtraction, or 10's complementing. The number X may be entered directly into the adder, whereas a number A to be added to or subtracted from X may be obtained from a memory M through the complementer. Number A may, for example, be stored in memory M in terms of its absolute value $N_A$ plus a sign digit $S_A$, $S_A$ being 0 if the number A is positive and 1 if A is negative. Thus, $N_A$ and $S_A$ may be supplied from memory M to the 9's complementer and control circuit 220, respectively, control circuit 220 being responsive both to $S_A$ and to an operation sign digit $S_0$ for generating a shift-or-complement signal S. Complementing is required if the number A is positive and the operation is subtraction, or if A is negative and the operation is addition. Thus assigning to $S_0$ the value 0 for addition and 1 for subtraction, the function for S is:

$$S=\overline{S}_A.S_0+S_A.\overline{S}_0 \qquad (29)$$

Similarly, shifting is to be performed if the number is negative and the operation is subtraction, or if the number is positive and the operation is addition, hence the function for $\overline{S}$ becomes:

$$\overline{S}=S_A.S_0+\overline{S}_A.\overline{S}_0 \qquad (30)$$

Figure 3:
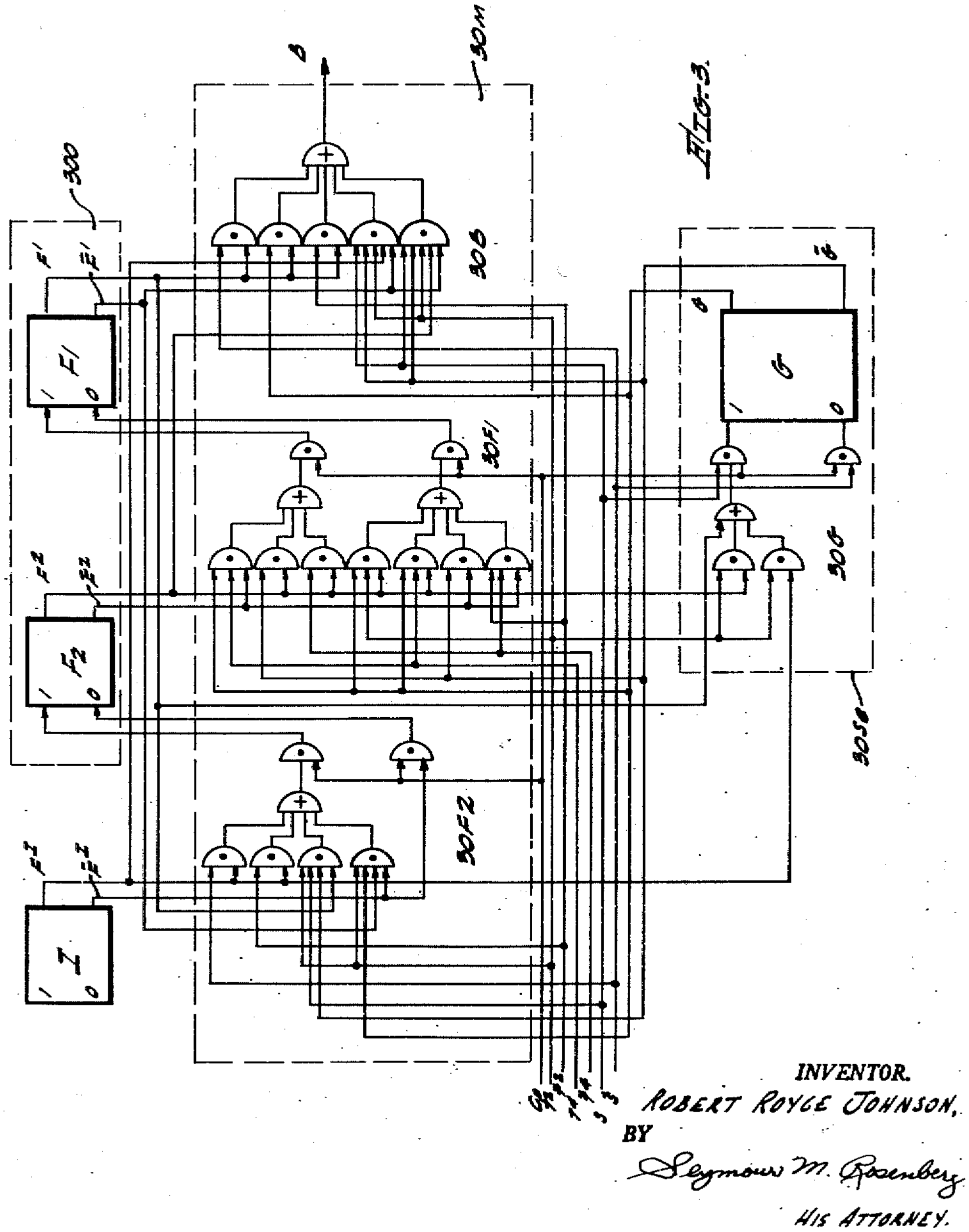
Fig. 3 is a schematic diagram of another electronic circuit for directly forming the 10's complements of binary-coded decimal numbers, in accordance with the present invention.

If the resultant is negative it will appear in complementary form and may be recomplemented by a direct 10's complementer such as shown in Fig.1 or Fig. 3.

The circuit of Fig. 2 may be utilized to produce the 10's complement of the number A, if no number X is supplied to the adder. If $S_A$ is 1 and $S_0$ is 0, or if $S_A$ is 0 and $S_0$ is 1, the 9's complement of number A will be formed by the 9's complementer, and the adder will provide carry signals for forming the 10's complement. Thus, the 10's complement of the number A will appear at the output of the adder.

Reference is now made to Fig. 3 wherein is shown another direct 10's complementing circuit, selectively operable in response to a control signal S either to shift, or to shift and complement, applied signals representing a decimal number. Like the circuit of Fig. 1, the circuit of Fig. 3 includes a shifting and converting register 300, a gating matrix 30M, and a sequence control **30S*e*. Input information read into the register from a flip-flop I is progressively shifted through flip-flops F2 and F1, respectively, controlled by gating circuits 30F2 and 30F1 included in matrix 30M, the output information being produced by a final gating circuit 30B which is also included in matrix 30M. During complementing, the proper sequence of 10's and 9's complements of the digits of the applied number is controlled by sequence control circuit 30S*e*, which includes a flip-flop G and a gating circuit 30G** for supplying input signals thereto.

In the circuit of Fig. 3, register 300 is shortened by one flip-flop as compared to register 100 of Fig. 1, hence the time delay between input information and output information is reduced from three bit times to two bit times. In order to accomplish this, two principal changes have been made over the circuit of Fig. 1. First, the circuit of Fig. 3 utilizes two correction intervals $T^2$ and $T^4$, whereas the circuit of Fig. 1 formulates all required bit conversions during one interval $T^1$. Secondly, since in 10's complementing a dit the 2d and 4th output bits must be derived as functions of all four input bits, flip-flop G is utilized to provide auxiliary storage capacity to compensate for the decreased capacity of the register. In addition, the logical gating circuits of Fig. 3 are modified to provide the same over-all operation as the circuit of Fig. 1.

The operation of the circuit of Fig. 3 may be more clearly understood by reference to Table VII, wherein are shown both the shifting and the complementing operations of the circuit, plotted as functions of time intervals $T^1$, $T^2$, $T^3$, and $T^4$. Table VII includes three binary digit groups $I_0^J$, $I_1^J$, and $I_K^J$, which are respectively shifted, 10's complemented, and 9's complemented. Considering $T^2$ as the basic correction interval, it may be noted from Table VII that for shifting S is 0 and G is 0; for 10's complementing S is 1 and G has the value of signal $I_1^1$; and for 9's complementing both S and G are 1.

During the basic correction interval $T^2$, the 2d, 3d, and

4th output bits required for complementing are formulated, the 2d bit being produced directly by final gating circuit 30B during $T^2$, and the 3d and 4th bits being produced by flip-flops F1 and F2, respectively, during $T^3$. During $T^2$, flip-flops I, F2, and F1 store only three bits of information, whereas by reference to the discussion in connection with Table I it may be observed that during 10's complementing the output bits $O_1^2$ and $O_1^4$ are functions of all four input bits. During $T^2$ for 10's complementing, therefore, flip-flop G is utilized to store signal $I_1^1$. Thus, G is 1 if the applied dit is odd, and is 0 if the dit value is even. By referring to Table I it may be noted that, where the dit value is odd, the 2d, 3d, and 4th bits of the 10's complement are identical to the corresponding bits of the 9's complement. These operations may be expressed by operation control symbols as follows:

TABLE VII

| | | | | I | F2 | F1 | B | G | S | | |
|---|---|---|---|---|---|---|---|---|---|---|---|
| | | | $I_0^4$ | $I_0^3$ | $I_0^2$ | $I_0^1$ | $I_0^1$ | | | $T^1$ | |
| $I_1^4$ | $I_1^3$ | $I_1^2$ | $I_1^1$ | $I_0^4$ | $I_0^3$ | $I_0^2$ | $I_0^2$ | 0 | 0 | $T^2$ | Shift |
| | $I_1^4$ | $I_1^3$ | $I_1^2$ | $I_1^1$ | $I_0^4$ | $I_0^3$ | $I_0^3$ | | | $T^3$ | |
| | | $I_1^4$ | $I_1^3$ | $I_1^2$ | $I_1^1$ | $I_0^4$ | $I_0^4$ | 0 | | $T^4$ | |
| | | | $I_1^4$ | $I_1^3$ | $I_1^2$ | $O_1^1$ | $O_1^1$ | 0 | | $T^1$ | |
| $I_k^4$ | $I_k^3$ | $I_k^2$ | $I_k^1$ | $I_1^4$ | $I_1^3$ | $I_1^2$ | $O_1^2$ | $I_1^1$ | 1 | $T^2$ | 10's |
| | $I_k^4$ | $I_k^3$ | $I_k^2$ | $I_k^1$ | $O_1^4$ | $O_1^3$ | $O_1^3$ | | | $T^3$ | |
| | | $I_k^4$ | $I_k^3$ | $I_k^2$ | $I_k^1$ | $O_1^4$ | $O_1^4$ | 0,1 | 1 | $T^4$ | |
| | | | $I_k^4$ | $I_k^3$ | $I_k^2$ | $O_k^1$ | $O_k^1$ | | | $T^1$ | |
| | | | | $I_k^4$ | $I_k^3$ | $I_k^2$ | $O_k^2$ | 1 | 1 | $T^2$ | 9's |
| | | | | | $O_k^4$ | $O_k^3$ | $O_k^3$ | | | $T^3$ | |
| | | | | | | $O_k^4$ | $O_k^4$ | | | $T^4$ | |

$S.\bar{G}.T^2$, indicating the forming of 2d, 3d, and 4th bits for the 10's complements of even-valued dits, and $G.T^2$, indicating the forming of 2d, 3d, and 4th bits for 9's complements, or for 10's complements of odd-valued dits.

During correction interval $T^4$, the first output bit for complementing is formed, appearing on flip-flop F1 during $T^1$. Since $O_1^1=I_1^1$, for the 10's complement this operation involves only shifting. Another operation control symbol may therefore be expressed as $G.T^4$, indicating the forming of the 1st output bit for 9's complementing.

Further operation control symbols may be derived as:

$(\bar{S}+\bar{T}^2)$, indicating shifting for flip-flop F2, and $(\bar{S}+\bar{T}^2).(\bar{G}+\bar{T}^4)$, indicating shifting for flip-flop F1.

Mechanization of sequence control circuit 30S*e* will now be considered. G is normally 0 during shifting, stores $I_1^1$ during $T^2$ for 10's complementing, and must, in response to the first dit of value other than zero, change to 1 by $T^4$ time in order to control the 9's complementing of succeeding dits. If the first dit of a number to be complemented has the value 0, however, G must remain 0 until the next dit is received. Flip-flop G may then be mechanized as follows:

$$1G=S.[F^1+T^2.(F^2+F^I)].cp \qquad (31)$$

and $$0G=\bar{S}.cp$$

The mechanization of final gating circuit 30B will now be considered. Gating circuit 30B shifts whenever flip-flop F2 shifts. During $T^2$ when G is 1, the operation is again shifting, since $O_k^2=I_k^2$, and $O_1^2=I_1^2$ for odd dit values. These operations may be expressed as:

$$B=(\bar{S}+\bar{T}^2+G).F^1 \qquad (32)$$

During $T^2$ when G is 0, the operation is 10's complementing of even-valued dits. From Table I $$O_1^2=(I_1^4+I_1^3).\bar{I}_1^2 \qquad (33)$$

hence from Table VII $$O_1^2=(F^I+F^2).\bar{F}^1 \qquad (34)$$

which when combined with the operation control symbol $S.\bar{G}.T^2$, and the above-derived expression for shifting, yields the expression $$B=(\bar{S}+\bar{T}^2+G).F^1+S.\bar{G}.T^2.(F^1+F^2).\bar{F}^1 \qquad (35)$$

The required mechanization of gating circuits 30F1 and 30F2, for providing input signals for flip-flops F1 and F2, respectively, will now be considered. These mechanizations have been selected, in the circuit of Fig. 3, according to the simplified partial changing functions. During $T^4$, only one converted signal must be formed, at the input of flip-flop F1. From Table I, $O_k^1=\bar{I}_k^1$. Referring to Table III*a*, and substituting $\bar{F}^2$ for F′, the functions become:

$$1F1=G.T^4.\bar{F}^2 \qquad (36)$$

and $$0F1=G.T^4.F^2$$

All the remaining complement conversions are formed during time $T^2$. Reference is therefore made to Table VIII, wherein are shown the desired transitions from $T^2$ to $T^3$ for flip-flops F2 and F1; input signals 1F2, 0F2, and 1F1, 0F1, derived according to the simplified partial changing functions; and data columns representing the stable states of flip-flops I, F2, and F1 during $T^2$, from which expressions for the required input signals may be derived. In Table VIII, separate tabulations are provided for the 10's complementing of even-valued dits ($S.G.T^2$), and for 9's complementing and the 10's complementing of odd-valued dits ($G.T^2$).

For the operation during $S.\bar{G}.T^2$, the functions for flip-flop F1 may be expressed as $$1F1=F^2 \qquad (37)$$

and $$0F1=\bar{F}^2$$

TABLE VIII

*Input requirements for flip-flops F1 and F2 during $T^2$*

| | $F^I$ | $F^2$ | $F^1$ | $F^2$ ($T^3$) | $F^1$ ($T^3$) | 1F2 | 0F2 | 1F1 | 0F1 |
|---|---|---|---|---|---|---|---|---|---|
| S. $\overline{G}$. $T^2$ | $I_l^4$ | $I_l^3$ | $I_l^2$ | $O_l^4$ | $O_l^3$ | | | | |
| Dit Value 0 | 0 | 0 | 0 | 0 | 0 | 0 | | 0 | |
| 2 | 0 | 0 | 1 | 1 | 0 | 1 | | | 1 |
| 4 | 0 | 1 | 0 | 0 | 1 | | 1 | 1 | |
| 6 | 0 | 1 | 1 | 0 | 1 | | 1 | | 0 |
| 8 | 1 | 0 | 0 | 0 | 0 | 0 | | 0 | |
| G. $T^2$ | $I_k^4$ | $I_k^3$ | $I_k^2$ | $O_k^4$ | $O_k^3$ | | | | |
| 0 | 0 | 0 | 0 | 1 | 0 | 1 | | 0 | |
| *1 | 0 | 0 | 0 | 1 | 0 | 1 | | 0 | |
| 2 | 0 | 0 | 1 | 0 | 1 | 0 | | | 0 |
| *3 | 0 | 0 | 1 | 0 | 1 | 0 | | | 0 |
| 4 | 0 | 1 | 0 | 0 | 1 | | 1 | 1 | |
| *5 | 0 | 1 | 0 | 0 | 1 | | 1 | 1 | |
| 6 | 0 | 1 | 1 | 0 | 0 | | 1 | | 1 |
| *7 | 0 | 1 | 1 | 0 | 0 | | 1 | | 1 |
| 8 | 1 | 0 | 0 | 0 | 0 | 0 | | 0 | |
| *9 | 1 | 0 | 0 | 0 | 0 | 0 | | 0 | |

*Correspond to 10's complement for dit values of 1, 3, 5, 7, and 9, respectively.

and for the operation G.$T^2$ the functions are $$1F1=F^2 \quad (38)$$

and $$0F1=F^2$$

Thus the combined functions become:

$$1F1=(\overline{S}+\overline{T^2}).(\overline{G}+\overline{T^4}).F^2+G.T^4.\overline{F^2}+S.\overline{G}.T^2.F^2+G.T^2.F^2 \quad (39)$$
$$=G.T^4.\overline{F^2}+(\overline{G}+\overline{T^4}).F^2$$

and $$0F1=(\overline{S}+\overline{T^2}).(\overline{G}+\overline{T^4}).\overline{F^2}+G.T^4.F^2+S.\overline{G}.T^2.\overline{F^2}+G.T^2.F^2$$
$$=G.(T^2+T^4).F^2+(\overline{G}+\overline{T^2}.\overline{T^4}).\overline{F^2}$$

Similarly, for flip-flop F2 the functions for the operation during S.$\overline{G}$.$T^2$ are $$1F2=F^1 \quad (40)$$

and $$0F2=\overline{F^I}, \text{ or, } 0F2=1$$

and for the operation G.$T^2$ $$1F2=\overline{F^1}.\overline{F^I} \quad (41)$$

and $$0F2=\overline{F^I}, \text{ or, } 0F2=1$$

Combining, the complete functions become:

$$1F2=(\overline{S}+\overline{T^2}).F^I+S.\overline{G}.T^2.F^1+G.T^2.\overline{F^1}.\overline{F^I} \quad (42)$$
$$=(\overline{S}+\overline{T^2}).F^I+T^2.(S.\overline{G}.F^1+G.\overline{F^1}).\overline{F^I}$$
$$0F2=(\overline{S}+\overline{T^2}).\overline{F^I}+S.\overline{G}.T^2.\overline{F^I}+G.T^2.\overline{F^I}$$
$$=\overline{F^I}$$

It may be noted that in the circuit of Fig. 1 the gating matrices include many voltage levels. However, it may be advantageous to restrict the number of voltage levels in the matrices, as for example, where high reliability and low operating cost are desired. Such a mechanization is shown in Fig. 3, where each matrix has a maximum of two voltage levels. Accordingly, the final logical expressions for the circuit of Fig. 3 become:

$$(30G)\quad 1G=S.(F^1+T^2.F^2+T^2.F^I).cp$$
$$0G=\overline{S}.cp \quad (43)$$

$$(30B)\quad B=\overline{S}.F^1+G.F^1+\overline{T^2}.F^1+S.\overline{G}.T^2.F^I.\overline{F^1}+S.\overline{G}.T^2.F^2.\overline{F^1} \quad (44)$$

$$(30F1)\quad 1F1=[G.T^4.\overline{F^2}+\overline{G}.F^2+\overline{T^4}.F^2].cp$$
$$0F1=[G.T^2.F^2+G.T^4.F^2+\overline{G}.\overline{F^2}+\overline{T^2}.\overline{T^4}.\overline{F^2}].cp \quad (45)$$

$$(30F2)\quad 1F2=[\overline{S}.F^I+\overline{T^2}.F^I+T^2.S.\overline{G}.F^1+T^2.G.\overline{F^1}.\overline{F^I}].cp$$
$$0F2=\overline{F^I}.cp \quad (46)$$

where the dot (.) and the plus (+) are mechanized with "and" and "or" circuits, respectively, as previously described.

From the foregoing description it is apparent that the present invention provides a serial binary-coded decimal complementer circuit for receiving a series of groups of binary signals respectively representing the digits of a decimal number in the order of increasing significance, and for shifting the groups at a constant rate, the circuit being selectively operable in response to a control signal to produce output signals representing the complement of the number. As this type of complementer circuit provides equal time delays for the operations of shifting and of complementing, without the need for a special bypass circuit, its advantages when utilized in a serial computer are readily apparent.

In Figs. 1 and 3 there have been disclosed complementer circuits which are operable to produce in one integrated operation signals representing the 10's complement of an applied number. As previously pointed out, such direct 10's complementers may be utilized at the output of an arithmetic unit for recomplementing negative resultants without re-routing information through the adder a second time, thus substantially shortening the time required for non-cumulative addition and subtraction operations.

In Fig. 2, on the other hand, there has been disclosed a 9's complementer which may be utilized in conjunction with an adder circuit for adding or subtracting decimal numbers in the excess-zero binary code. In this adder-subtracter the corrections required for maintaining the representation of decimal numbers in accordance with the code are much simpler than the corresponding corrections required in the excess-three code, shown in the Harvard reference previously mentioned. Furthermore, the need for correction circuits for subtraction, such as are required in the adder-subtracter described in the above-mentioned copending application Serial No. 322,665 by Nelson, has been obviated since both addition and subtraction operations are performed by adding. As previously pointed out, in the special case where the number supplied direct to the adder is zero, the 10's complement of the other number is produced at the output of the adder.

Since the above-described mechanization of the 9's complementer in the excess-zero code is relatively simple, the adder-subtracter combination thereby made available is more economical than either of those shown by Harvard and by Nelson. A further advantage of the present invention over adder-subtracters mechanized in other codes is that the excess-zero code is easier to understand and to use, since the value of each decimal digit is represented directly by the corresponding binary number.

It has also been shown how, according to the present invention, serial complementer circuits may be constructed of flip-flops and gating circuits, achieving economy of circuit elements through full utilization of the information storage capabilities of the flip-flops. However, it must be understood that the invention is not limited to the use of flip-flops, as other suitable bistable elements may be used.

The voltage-level system of controlling circuit operation has been specifically shown herein, in connection with Figs. 1, 2, and 3. It is to be understood, however, that the invention is not so limited, but may also be utilized in a system wherein pulses, rather than voltage levels, represent the binary digits.

In the specifically described figures, each flip-flop is shown as being controlled according to one particular type of function. It is apparent, however, that the setting, changing, partial changing, or simplified partial changing functions, or any modifications or combinations thereof, may be utilized in controlling any particular flip-flop. Also, the number of voltage levels employed in the gating matrices may be varied. For any particular application, the desired mechanization may be selected on the basis of size, weight, initial cost, reliability, power consumption, operating cost, and other factors.

Other modifications and other applications, not specifically described herein, will be apparent to those skilled in the art.

What is claimed as new is:

1. In a serial binary-coded decimal computer, a circuit for receiving a series of groups of binary signals respectively representing the digits of a decimal number in the order of increasing significance, and for shifting the groups at a constant rate, the circuit being selectively operable in response to a control signal to produce output signals representing the complement of the number, said circuit comprising: register means for receiving and shifting the groups of binary signals, said register means being actuable to convert each group of signals to signals representing the 9's complement of the corresponding digit of the number; sequence control means responsive to the control signal for generating a sequencing signal indicating the period of operation prior to and during the reception of the first non-zero digit of the number; first gating circuit means coupled to said register means and responsive to the control signal and to said sequencing signal for producing signals representing the 10's complement of the first non-zero digit of the number; and second gating circuit means coupled to said register means and responsive to the control signal and to said sequencing signal for actuating said register means to produce signals representing the 9's complements of succeeding digits of the number.

2. A circuit selectively operable in response to a bilevel control signal to shift, or to shift and complement, a series of input signals representing a decimal number, said signals being applied in the order of increasing significance, said circuit comprising: a shifting and converting register for receiving the input signals, said register being responsive to a first level of the control signal to shift the input signals, and being actuable to produce output signals representing the complement of the number; sequence control means responsive to a second level of the control signal and to the input signals for forming a sequencing signal indicating the sequence of 10's complements and 9's complements of the digits of the number required to form the complement of the number; first means coupled to said register and responsive to said second level of the control signal and to said sequencing signal for actuating said register to produce signals representing the 10's complement of the first non-zero digit of the number; and second means coupled to said register and responsive to said second level of the control signal and to said sequencing signal for actuating said register to produce signals representing the 9's complements of the higher place digits of the number.

3. The circuit defined in claim 2 wherein each decimal digit is represented by a series of four binary digits having weights of 8,4, 2, and 1, respectively, according to the excess-zero code; wherein said register includes first and second series coupled flip-flops; and wherein said first and second means comprise a gating matrix including a plurality of logical gating circuits, one gating circuit for controlling each of said flip-flops, and a final gating circuit connected to said second flip-flop.

4. In a serial adder-subtracter for performing addition or subtraction of decimal numbers represented by corresponding series of input signals wherein addition is performed directly by an adder circuit and subtraction is performed by adding the 9's complement of one of the numbers to the other number and adding 1 in the least significant place; a 9's complementer circuit selectively operable in response to a bilevel control signal to shift, or to shift and 9's complement, an applied series of input signals to produce output signals corresponding to the input signals during a first level of the control signal and corresponding to the 9's complement of the input signals during a second level of the control signal, said 9's complementer circuit comprising: a shifting and converting register, including first, second and third flip-flops, for receiving the input signals, each of said flip-flops including a 1 and a 0 input circuit, and a pair of output circuits for producing a pair of complementary voltage-state signals; a gating matrix including first, second and third logical gating circuits coupled to said input circuits of said first, second and third flip-flops, respectively, for controlling said flip-flops, and a final gating circuit coupled to the output circuits of said first flip-flop for producing the output signals, the output signals being produced after a time delay corresponding to the digit storage capacity of said register, the time delay being substantially the same for shifting and for complementing, said gating matrix being responsive to the first level of the control signal for actuating said register to shift the input signals and to the second level of the control signal for actuating said register to produce signals representing the 9's complement of the number.

5. In a binary-coded decimal computer, a circuit selectively operable in response to a first voltage-level signal $\overline{S}$ to shift a binary series $I_k^j$ of input signals representing a decimal number, and operable in response to a second voltage-level signal S to shift and convert the series $I_k^j$ into a binary series $O_k^j$ of output signals representing the complement of the number, where $j$ and $k$ respectively indicate the binary and decimal digital positions, signals $I_k^j$ being applied in the order of increasing significance, said circuit comprising: a shifting and converting register for shifting signals $I_k^j$ in response to signal $\overline{S}$, and being actuable to produce output signals $O_k^j$; sequence control means responsive to signal S and to signals $I_k^j$ for forming a pair of complementary sequencing signals G and $\overline{G}$ indicating the reception of the first non-zero digit of the number; and a gating matrix comprising a plurality of gating circuits coupled to said register and responsive to signal S and to said sequencing signals for actuating said register to produce output signals $O_k^j$.

6. The circuit defined in claim 5 wherein the binary series $O_K^J$ of output signals represent the 10's complement of the number, the series $I_K^J$ being converted into the series $O_K^J$ in one integrated operation, the relationship between signals $O_K^J$ and $I_K^J$ being representable by the equations $$O_1^1=I_1^1$$

$$O_1^2=I_1^2.I_1^1+\bar{I}_1^2.\bar{I}_1^1.(I_1^3+I_1^4)$$

$$O_1^3=I_1^3.(\bar{I}_1^2+\bar{I}_1^1)+\bar{I}_1^3.I_1^2.I_1^1$$

and $$O_1^4=\bar{I}_1^4.\bar{I}_1^3.\bar{I}_1^2.I_1^1+\bar{I}_1^3.I_1^2.\bar{I}_1^1$$

where the subscript 1 indicates the least significant decimal digits up to and including the least significant non-zero digit of the number, and $$O_2^1=\bar{I}_2^1$$

$$O_2^2=I_2^2$$

$$O_2^3=\bar{I}_2^3.I_2^2+I_2^3.\bar{I}_2^2$$

and $$O_2^4=\bar{I}_2^4.\bar{I}_2^3.\bar{I}_2^2$$

where the subscript 2 indicates each of the more significant digits of the number, the plus (+) is defined as the logical non-exclusive "or" function, the dot (.) represents the logical multiplication or "and" function, and the bar (−) indicates the complement of a signal.

7. The circuit defined in claim 5 wherein each decimal digit is represented by a series of four binary digits; said resister includes flip-flops F1, F2, and F3, having 1 and 0 input circuit pairs 1F1, 0F1, 1F2, 0F2 and 1F3, 0F3, and producing complementary pairs of voltage-state signals $F^1$, $\bar{F}^1$, $F^2$, $F^2$, and $F^3$, $F^3$, respectively; said gating matrix includes first, second, and third gating circuits coupled to said input circuit pairs of flip-flops F1, F2, and F3, respectively, and a final gating circuit coupled to the outputs of said flip-flop F1, producing a signal B representing the output series $O_K^J$, signals $F^1$, $F^2$, and $F^3$ having values respectively corresponding to $I_K^1$, $I_K^2$, and $I_K^3$, during a time interval representable by complementary signals $T^1$ and $\bar{T}^1$, said gating matrix being responsive to signal $T^1$ for forming output signals $O_K^J$ when S is 1 and for shifting input signals $I_K^J$ when $\bar{S}$ is 1, and being responsive to signal $\bar{T}^1$ for shifting signals $I_K^J$ and $O_K^J$.

8. The circuit defined in claim 7 wherein said sequence control means includes a gating circuit 10G, a flip-flop G for forming said sequencing signals G and $\bar{G}$, said flip-flop G having input circuits 1G and 0G connected to said gating circuit 10G, signal $\bar{G}$ having a 1-representing value during the complementing of all digits up to and including the first non-zero digit of the number, and signal G having a 1-representing value during the complementing of all succeeding digits, said gating circuits 10G being defined by the logical equations:

$$1G=S.T^1.(F^1+F^2+F^3+F^I).cp$$

and $$0G=\bar{S}.cp$$

where $F^I$ is a signal representing the input series $I_K^J$, the plus (+) represents an "or" circuit for performing the logical non-exclusive "or" function, the dot (.) represents an "and" circuit for performing the logical multiplication or "and" function, and cp represents a clock-pulse or synchronizing signal.

9. The circuit defined in claim 7 wherein each decimal digit is represented by binary digits having weights of 8, 4, 2, and 1, respectively, according to the excess-zero code, the input series $I_K^J$ being received as complementary signals $F^I$, $\bar{F}^I$, said first, second, third, and final gating circuits being respectively defined by the logical equations:

$$1F1=\overline{0F1}=[F^2.(\bar{T}^1+\bar{S}+G+F^1)+$$
$$S.\bar{G}.T^1.\bar{F}^2.\bar{F}^1.(F^3+F^I)].cp$$

$$1F2=0F2=[F^3.(G.T^1+S.T^1.F^1+\bar{F}^2)+$$
$$\bar{F}^3.F^2.(\bar{T}^1+\bar{S}+\bar{G}.\bar{F}^1)].cp$$

$$1F3=[(\bar{T}^1+\bar{S}).F^I+S.T^1.(\bar{F}^I.\bar{F}^2+\bar{G}.F^2.\bar{F}^1)].cp$$

and $$0F3=[(\bar{T}^1+\bar{S}).\bar{F}^I+S.T^1.F^3].cp$$

$$B\ =(\bar{G}+\bar{T}^1).F^1+G.T^1.\bar{F}^1$$

where the plus (+) represents an "or" circuit for performing the logical non-exclusive "or" function, the dot (.) represents an "and" circuit for performing the logical multiplication or "and" function, the bar (−) indicates the complement of a signal, and cp represents a synchronizing signal.

10. The circuit defined in claim 5 wherein each decimal digit is represented by a series of four binary digits; said register includes flip-flops F1 and F2, having 1 and 0 input circuit pairs 1F1, 0F1, and 1F2, 0F2 and producing complementary pairs of voltage-state signals $F^1$, $\bar{F}^1$, and $F^2$, $\bar{F}^2$, respectively; said gating matrix includes first and second gating circuits coupled to said input circuits of flip-flops F1 and F2, respectively, and a final gating circuit coupled to the output circuits of flip-flop F1 producing a signal B representing the output series $O_K^J$, signals $F^1$ and $F^2$ having values respectively corresponding to $I_K^2$ and $I_K^3$ during a time interval representable by complementary signals $T^2$ and $\bar{T}^2$ and corresponding to $I_K^4$ and $I_K^1$ during a time interval representable by complementary signals $T^4$ and $\bar{T}^4$, said gating matrix being responsive to signal $T^2$ for forming output signals $O_K^J$ when S is 1 and for shifting input signals $I_K^J$ when $\bar{S}$ is 1, said second and said final gating circuits being responsive to signal $\bar{T}^2$ for shifting signals $I_K^J$ and $O_K^J$, and said first gating circuit being responsive to signal $T^4$ for forming output signal $O_K^1$ when S is 1 and for shifting input signal $I_K^1$ when $\bar{S}$ is 1.

11. The circuit defined in claim 10 wherein said sequence control means includes a gating circuit 30G, a flip-flop G for forming said sequencing signals G and $\bar{G}$, said flip-flop G having input circuits 1G and 0G connected to said gating circuit 30G, signal $\bar{G}$ having a 1-representing value during the complementing of all digits prior to the first non-zero digit of the number, flip-flop G being operative to store a signal $I_1^1$ corresponding to the first binary digit representing the first non-zero digit of the number during the complementing thereof, and signal G having a 1-representing value during the complementing of all succeeding digits, said gating circuit 30G being defined by the logical equations:

$$1G=S.(F^1+T^2.F^2+T^2.FI).cp$$

and $$0G=\bar{S}.cp$$

where FI is a signal representing the input series $I_K^J$, the plus (+) represents an "or" circuit for performing the logical non-exclusive "or" function, the dot (.) represents an "and" circuit for performing the logical multiplication or "and" function, and cp represents a clock-pulse or synchronizing signal.

12. The circuit defined in claim 10 wherein each decimal digit is represented by binary digits having weights of 8, 4, 2, and 1, respectively, according to the excess-zero code, the input series $I_K^J$ being received as complementary signals $F^I$, $\bar{F}^I$, said first, second, and final gating circuits being respectively defined by the logical equations:

$$1F1=[G.T^4.\overline{F}^2+\overline{G}.F^2+\overline{T}^4.F^2].cp$$

and $$0F1=[G.T^2.F^2+G.T^4.F^2+\overline{G}.\overline{F}^2+\overline{T}^2.\overline{T}^4.\overline{F}^2].cp$$

$$1F2=[\overline{S}.F^I+\overline{T}^2.F^I+T^2.S.\overline{G}.F^1+T^2.G.\overline{F}^1.\overline{F}^I].cp$$

and $$0F2=\overline{F}^I.cp$$

and $$B \;=\overline{S}.F^1+G.F^1+\overline{T}^2.F^1+S.\overline{G}.T^2.F^I.\overline{F}^1+S.\overline{G}.T^2.F^2.\overline{F}^1$$

where the plus (+) represents an "or" circuit for performing the logical non-exclusive "or" function, the dot (·) represents an "and" circuit for performing the logical multiplication or "and" function, the (—) indicates the complement of a signal, and cp represents a synchronizing signal.

13. In a serial adder-subtracter for performing addition or subtraction of decimal numbers represented by corresponding series of input signals, wherein addition is performed directly by an adder circuit and subtraction is performed by adding the 9's complement of one of the numbers to the other number and adding 1 in the least significant place; a circuit selectively operable in response to a first voltage-level signal $\overline{S}$ to shift a binary series $I_k^j$ of input signals representing a decimal number, or in response to a second voltage-level signal S to shift and convert the series $I_k^j$ into a binary series $O_k^j$ of output signals representing the 9's complement of the number, where $j$ and $k$ respectively indicate the binary and decimal digital positions, signals $I_k^j$ being applied in the order of increasing significance, said circuit comprising: a shifting and converting register including first, second and third flip-flops; a gating matrix including first, second and third logical gating circuits coupled to said first, second and third flip-flops, respectively, for controlling their operation, and a final gating circuit connected to said first flip-flop for producing the output signals, the output signals being related to the input signals according to the functions:

$$O_k^1=\overline{I}_k^1$$
$$O_k^2=I_k^2$$
$$O_k^3=\overline{I}_k^3\cdot I_k^2+I_k^3\cdot\overline{I}_k^2$$

and $$O_k^4=\overline{I}_k^4\cdot\overline{I}_k^3\cdot\overline{I}_k^2$$

wherein the subscript $k$ indicates any digit of the number, the plus (+) is defined as the logical non-exclusive "or" function, the dot (·) represents the logical multiplication or "and" function, and the bar (—) indicates the complement of a signal.

14. The circuit defined in claim 13 wherein each decimal digit is represented by a series of four binary digits; said register also includes a third flip-flop and said gating matrix also includes a third gating circuit coupled to said third flip-flop for controlling the operation thereof, said first, second, and third flip-flops having 1 and 0 input circuit pairs 1F1, 0F1, 1F2, 0F2, and 1F3, 0F3, respectively, and producing pairs of complementary voltage-state signals $F^1$, $\overline{F}^1$, $F^2$, $\overline{F}^2$, and $F^3$, $\overline{F}^3$, respectively; signals $F^1$ and $F^2$ having values respectively corresponding to $I_k^1$ and $I_k^2$ during a time interval representable by complementary signals $T^1$ and $\overline{T}^1$, said gating matrix being responsive to signal $T^1$ for forming output signals $O_k^j$ when S is 1 and for shifting input signals $I_k^j$ when $\overline{S}$ is 1, and being responsive to signal $\overline{T}^1$ for shifting signals $I_k^j$ and $O_k^j$.

15. The circuit defined in claim 14 wherein each decimal digit is represented by binary digits having weights of 8, 4, 2, and 1, respectively, according to the excess-zero code, the input series $I_k^j$ being received as complementary signals $F^I$, $\overline{F}^I$, said first, second, third, and final gating circuits being respectively defined by the logical equations:

$$1F1=\overline{0F1}=F^2.cp$$

$$1F2=0F2=[F^3.\overline{F}^2+F^3.S.T^1+\overline{F}^3.F^2.(\overline{T}^1+\overline{S})].cp$$

$$1F3=[(\overline{T}^1+\overline{S}).F^I+S.T^1.\overline{F}^I.\overline{F}^2].cp$$

and $$0F3=\overline{F}^I.cp$$

and $$B \;=(\overline{T}^1+\overline{S}).F^1+S.T^1.\overline{F}^1$$

where the plus (+) represents an "or" circuit for performing the logical non-exclusive "or" function, the dot (·) represents an "and" circuit for performing the logical multiplication or "and" function, the bar (−) indicates the complement of a signal, and cp represents a clock-pulse or synchronizing signal.

16. In a serial binary-coded decimal computer, a circuit selectively operable in response to a first voltage-level signal $\overline{S}$ to shift a binary series $I_k^j$ of input signals representing a decimal number, or in response to a second voltage-level signal S to shift and simultaneously convert the series $I_k^j$ into a binary series $O_k^j$ of output signals representing the 10's complement of the number, where $j$ and $k$ respectively indicate the binary and decimal digital positions, signals $I_k^j$ being applied in the order of increasing significance, said circuit comprising: a shifting and converting register for receiving, storing, and progressively shifting signals $I_k^j$, said register being actuable to convert the signals $I_k^j$ into the signals $O_k^j$; sequence control means responsive to signal S and to signals $I_k^j$ for forming complementary sequencing signals G and $\overline{G}$ indicating the first non-zero digit of the number; and gating matrix means responsive to the signal S and to said signals G and $\overline{G}$ for actuating said register to convert the signals $I_k^j$ into the signals $O_k^j$, signals $O_k^j$ representing the 10's complements of the first digits up to and including the first non-zero digit of the number, and the 9's complements of the higher place digits.

17. The circuit defined in claim 16 wherein each decimal digit is represented by a series of binary digits having weights of 8, 4, 2, and 1, respectively, according to the excess-zero code; said register includes a plurality of series coupled flip-flops; and said gating matrix means includes a separate gating circuit for controlling each of said flip-flops, and a final gating circuit coupled to the last flip-flop of said register for producing said output signals $O_k^j$ or said shifted input signals $I_k^j$.

18. An electronic circuit for receiving a binary signal series representing a decimal number in coded form, and for progressively shifting and modifying the signal series to produce a modified signal series representing the complement of the decimal number, said circuit comprising: a plurality of bistable elements connected in a series to receive and progresssively shift the signal series, each bistable element having input and output circuits; a plurality of gating circuits, one gating circuit being connected to the input circuits of each except the first one of said bistable elements for controlling the operation thereof, each of said gating circuits being coupled to the output circuits of at least two of said bistable elements and responsive to binary signals stored therein for controlling the input circuits of the corresponding bistable element associated with said gating circuit.

References Cited in the file of this patent

UNITED STATES PATENTS

| | | |
|---|---|---|
| 2,609,143 | Stibitz | Sept. 2, 1952 |
| 2,634,052 | Bloch | Apr. 7, 1953 |
| 2,654,080 | Browne | Sept. 29, 1953 |
| 2,666,575 | Edwards | Jan. 19, 1954 |
| 2,758,788 | Yaeger | Aug. 14, 1956 |
| 2,761,621 | Wright et al. | Sept. 4, 1956 |

UNITED STATES PATENT OFFICE
Certificate of Correction

Patent No. 2,799,450 — July 16, 1957

Robert Royce Johnson

It is hereby certified that error appears in the printed specification of the above numbered patent requiring correction and that the said Letters Patent should read as corrected below.

Column 5, line 64, strike out "dit of the", second occurrence; column 8, line 18, for "$\bar{F}^1$ and $F^1$" read —$F^1$ and $\bar{F}^1$—; line 38, for "July 1, 1953" read —July 7, 1953—; column 12, line 58, for "$F^2$ for $F^1$" read —$F^2$ for $F'$—; column 13, line 60, for "flip-kop" read —flip-flop—; column 14, line 5, for $$0F2=(\bar{T}^1+\bar{S}).F^3.\bar{F}^2+\bar{F}^3.F^2)+S.\bar{G}.T^1.[F^3.(\bar{F}^2+F^1)+$$

read $$0F2=(\bar{T}^1+\bar{S}).(F^3.\bar{F}^2+\bar{F}^3.F^2)+S.\bar{G}.T^1.[F^3.(\bar{F}^2+F^1)+$$

line 51, for "$0F3=\bar{F}^I$" read —$0F3=\bar{F}^I$—; column 15, line 1, after "mechanization" insert —(27)—; line 12, for $S.\bar{G}T^1.\bar{F}^2.\bar{F}^1.(F^3+F^I)].cp$ read $S.\bar{G}.T^1.\bar{F}^2.\bar{F}^1.(F^3+F^I)].cp$ line 14, for "].$cp$" read —+—; line 43, for "$G.T^1.F^1$" read —$G.T^1.\bar{F}^1$—; column 25, line 31, for "resister" read —register—; line 35, for $F^1$, $\bar{F}^1$, $F^2$, $F^2$, and $F^3$, $F^3$, read $F^1$, $\bar{F}^1$, $F^2$, $\bar{F}^2$, and $F^3$, $\bar{F}^3$, column 26, lines 60 and 63, for "FI" read —$F^I$—.

Signed and sealed this 19th day of November 1957.

[SEAL]

Attest:

KARL H. AXLINE,
*Attesting Officer.*

ROBERT C. WATSON,
*Commissioner of Patents.*